US010587553B1

(12) United States Patent
Ghafourifar et al.

(10) Patent No.: US 10,587,553 B1
(45) Date of Patent: Mar. 10, 2020

(54) METHODS AND SYSTEMS TO SUPPORT ADAPTIVE MULTI-PARTICIPANT THREAD MONITORING

(71) Applicant: Entefy Inc., Palo Alto, CA (US)

(72) Inventors: Alston Ghafourifar, Los Altos Hills, CA (US); Mehdi Ghafourifar, Los Altos Hill, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 17 days.

(21) Appl. No.: 15/859,158

(22) Filed: Dec. 29, 2017

(51) Int. Cl.
*H04L 12/58* (2006.01)
*G06F 17/27* (2006.01)
*H04L 29/06* (2006.01)

(52) U.S. Cl.
CPC .......... *H04L 51/16* (2013.01); *G06F 17/2705* (2013.01); *H04L 51/04* (2013.01); *H04L 65/403* (2013.01)

(58) Field of Classification Search
CPC ............................. H04L 51/04; H04L 65/403
See application file for complete search history.

(56) References Cited

U.S. PATENT DOCUMENTS

| 5,481,597 | A | 1/1996 | Given |
| 5,951,638 | A | 9/1999 | Hoss |
| 6,101,320 | A | 8/2000 | Schuetze |
| 6,950,502 | B1 | 9/2005 | Jenkins |
| 7,450,937 | B1 | 11/2008 | Claudatos |
| 7,673,327 | B1 | 3/2010 | Polis |
| 7,814,048 | B2 * | 10/2010 | Zhou .................. H04L 12/1831 707/602 |
| 7,886,000 | B1 | 2/2011 | Polis |
| 7,908,647 | B1 | 3/2011 | Polis |
| 8,055,715 | B2 * | 11/2011 | Bensky ............... G06Q 10/107 707/758 |
| 8,090,787 | B2 | 1/2012 | Polis |

(Continued)

FOREIGN PATENT DOCUMENTS

WO 9931575 6/1999
WO 2013112570 A1 8/2013

OTHER PUBLICATIONS

IBM, "Multi-Context Messaging", Aug. 10 (Year: 2009).*

*Primary Examiner* — Lashonda T Jacobs
(74) *Attorney, Agent, or Firm* — Haynes and Boone, LLP

(57) ABSTRACT

Disclosed are apparatuses, methods, and computer readable media for improved message presentation to a user with respect to correlation of messages in a multi-participant message thread. Conversational awareness may be determined by analyzing contents of individual messages and assigning them to an existing context or creating a new context. Association of messages to contexts allows for grouping related messages related to their subject matter. Further, analysis of individual users within a multi-party communication stream (e.g., a thread with a group of participants) can be used to report previous and predict future user activity of a specific user. Groups of different sizes have been determined to sometimes have different participation dynamics. For example, people communicate differently in small groups versus large groups and within a given group, individual participation dynamics can be further analyzed. Disclosed systems learn and leverage this communication dynamic.

20 Claims, 13 Drawing Sheets

(56) References Cited

U.S. PATENT DOCUMENTS

| | | | |
|---|---|---|---|
| 8,095,592 B2 | 1/2012 | Polis | |
| 8,108,460 B2 | 1/2012 | Polis | |
| 8,112,476 B2 | 2/2012 | Polis | |
| 8,122,080 B2 | 2/2012 | Polis | |
| 8,156,183 B2 | 4/2012 | Polis | |
| 8,281,125 B1 | 10/2012 | Briceno | |
| 8,296,360 B2 | 10/2012 | Polis | |
| 8,433,705 B1 | 4/2013 | Dredze | |
| 8,438,223 B2 | 5/2013 | Polis | |
| 8,458,256 B2 | 6/2013 | Polis | |
| 8,458,292 B2 | 6/2013 | Polis | |
| 8,458,347 B2 | 6/2013 | Polis | |
| 8,468,202 B2 | 6/2013 | Polis | |
| 8,819,145 B1* | 8/2014 | Gailloux | H04L 51/066 455/412.1 |
| 8,959,156 B2 | 2/2015 | Polis | |
| 9,116,984 B2* | 8/2015 | Caldwell | G06F 16/345 |
| 9,438,542 B1* | 9/2016 | Chen | H04L 51/04 |
| 9,705,832 B2* | 7/2017 | Waltermann | H04L 51/16 |
| 9,772,750 B2* | 9/2017 | Chen | H04L 51/04 |
| 9,886,664 B2* | 2/2018 | Dhara | G06N 5/02 |
| 10,002,117 B1* | 6/2018 | Ain | G06F 17/241 |
| 10,169,447 B2* | 1/2019 | Ghafourifar | G06F 21/6227 |
| 2002/0133509 A1 | 9/2002 | Johnston | |
| 2002/0152091 A1 | 10/2002 | Nagaoka | |
| 2002/0178000 A1 | 11/2002 | Aktas | |
| 2002/0194322 A1 | 12/2002 | Nagata | |
| 2004/0117507 A1 | 6/2004 | Torma | |
| 2004/0137884 A1 | 7/2004 | Engstrom | |
| 2004/0243719 A1 | 12/2004 | Roselinsky | |
| 2004/0266411 A1 | 12/2004 | Galicia | |
| 2005/0015443 A1 | 1/2005 | Levine | |
| 2005/0080857 A1 | 4/2005 | Kirsch | |
| 2005/0108345 A1* | 5/2005 | Suzuki | H04L 51/00 709/206 |
| 2005/0198159 A1 | 9/2005 | Kirsch | |
| 2006/0026593 A1* | 2/2006 | Canning | G06F 9/4843 718/100 |
| 2006/0112036 A1* | 5/2006 | Zhang | G06F 16/353 706/20 |
| 2006/0193450 A1 | 8/2006 | Flynt | |
| 2006/0271625 A1* | 11/2006 | Kordun | G06Q 10/10 709/204 |
| 2007/0054676 A1 | 3/2007 | Duan | |
| 2007/0130273 A1 | 6/2007 | Huynh | |
| 2007/0237135 A1 | 10/2007 | Trevallyn-Jones | |
| 2008/0062133 A1 | 3/2008 | Wolf | |
| 2008/0088428 A1 | 4/2008 | Pitre | |
| 2008/0162651 A1* | 7/2008 | Madnani | G06Q 10/107 709/206 |
| 2008/0192302 A1* | 8/2008 | Rohall | G06Q 10/107 358/402 |
| 2008/0261569 A1 | 10/2008 | Britt | |
| 2008/0263157 A1* | 10/2008 | Bhogal | G06Q 10/107 709/206 |
| 2008/0301250 A1* | 12/2008 | Hardy | G06Q 10/107 709/207 |
| 2009/0016504 A1 | 1/2009 | Mantell | |
| 2009/0119370 A1 | 5/2009 | Stern | |
| 2009/0177484 A1* | 7/2009 | Davis | G06Q 30/02 705/346 |
| 2009/0177744 A1 | 7/2009 | Marlow | |
| 2009/0181702 A1 | 7/2009 | Vargas | |
| 2009/0271486 A1 | 10/2009 | Ligh | |
| 2009/0292814 A1 | 11/2009 | Ting | |
| 2009/0299996 A1 | 12/2009 | Yu | |
| 2010/0057872 A1 | 3/2010 | Koons | |
| 2010/0210291 A1 | 8/2010 | Lauer | |
| 2010/0220585 A1 | 9/2010 | Poulson | |
| 2010/0229107 A1 | 9/2010 | Turner | |
| 2010/0323728 A1 | 12/2010 | Gould | |
| 2010/0325227 A1 | 12/2010 | Novy | |
| 2011/0041082 A1* | 2/2011 | Nguyen | G06Q 10/10 715/752 |
| 2011/0051913 A1 | 3/2011 | Kesler | |
| 2011/0078247 A1 | 3/2011 | Jackson | |
| 2011/0125252 A1* | 5/2011 | Goddard | A61F 2/95 623/1.23 |
| 2011/0130168 A1 | 6/2011 | Vendrow | |
| 2011/0194629 A1 | 8/2011 | Bekanich | |
| 2011/0219008 A1 | 9/2011 | Been | |
| 2012/0016858 A1 | 1/2012 | Rathod | |
| 2012/0124234 A1* | 5/2012 | Tewes | H04L 51/34 709/236 |
| 2012/0209847 A1 | 8/2012 | Rangan | |
| 2012/0210253 A1 | 8/2012 | Luna | |
| 2012/0221656 A1* | 8/2012 | Cai | H04L 12/586 709/206 |
| 2012/0221962 A1 | 8/2012 | Lew | |
| 2012/0246251 A1* | 9/2012 | Staats | G06Q 10/107 709/206 |
| 2013/0018945 A1 | 1/2013 | Vendrow | |
| 2013/0024521 A1 | 1/2013 | Pocklington | |
| 2013/0097279 A1 | 4/2013 | Polis | |
| 2013/0151508 A1 | 6/2013 | Kurabayashi | |
| 2013/0262852 A1 | 10/2013 | Roeder | |
| 2013/0267264 A1 | 10/2013 | Abuelsaad | |
| 2013/0304830 A1 | 11/2013 | Olsen | |
| 2013/0332308 A1 | 12/2013 | Linden | |
| 2014/0245178 A1* | 8/2014 | Smith | H04L 51/16 715/753 |
| 2014/0270131 A1 | 9/2014 | Hand | |
| 2014/0280460 A1 | 9/2014 | Nemer | |
| 2014/0297807 A1 | 10/2014 | Dasgupta | |
| 2014/0310365 A1* | 10/2014 | Sample | H04L 51/16 709/206 |
| 2014/0379815 A1* | 12/2014 | Cudak | H04L 51/16 709/206 |
| 2014/0379818 A1* | 12/2014 | Cudak | H04L 51/16 709/206 |
| 2015/0032686 A1* | 1/2015 | Kuchoor | G06F 17/241 707/608 |
| 2015/0039887 A1 | 2/2015 | Kahol | |
| 2015/0180808 A1* | 6/2015 | Moisa | G06T 11/001 709/206 |
| 2015/0186455 A1 | 7/2015 | Horling | |
| 2015/0188862 A1* | 7/2015 | Ghafourifar | H04L 51/066 709/206 |
| 2015/0188869 A1* | 7/2015 | Gilad | H04L 51/22 715/752 |
| 2015/0244657 A1* | 8/2015 | Ghafourifar | G06F 21/6227 709/206 |
| 2015/0278370 A1 | 10/2015 | Stratvert | |
| 2015/0281184 A1 | 10/2015 | Cooley | |
| 2015/0286943 A1 | 10/2015 | Wang | |
| 2015/0334075 A1* | 11/2015 | Wang | H04L 51/046 715/752 |
| 2015/0350142 A1* | 12/2015 | Guenther | G06F 3/0482 715/752 |
| 2016/0072755 A1* | 3/2016 | Su | H04L 51/16 709/206 |
| 2016/0087944 A1 | 3/2016 | Downey | |
| 2016/0112358 A1* | 4/2016 | Ghafourifar | H04L 51/12 709/206 |
| 2017/0142036 A1* | 5/2017 | Li | G06F 17/2765 |
| 2017/0168692 A1* | 6/2017 | Chandra | G06F 3/017 |
| 2017/0180294 A1* | 6/2017 | Milligan | H04L 51/16 |
| 2017/0353414 A1* | 12/2017 | Ertmann | H04L 51/32 |
| 2018/0048604 A1* | 2/2018 | Mikhailov | H04L 51/16 |
| 2018/0060599 A1* | 3/2018 | Horling | G06F 21/31 |
| 2018/0096427 A1* | 4/2018 | Pierce | H04L 51/04 |
| 2018/0183618 A1* | 6/2018 | Jayaram | H04L 51/32 |
| 2018/0198887 A1* | 7/2018 | Nishimura | H04L 67/306 |
| 2018/0287982 A1* | 10/2018 | Draeger | H04L 51/16 |
| 2019/0007228 A1* | 1/2019 | Vuskovic | G06F 16/00 |
| 2019/0140993 A1* | 5/2019 | Deets, Jr. | G06F 17/279 |
| 2019/0171693 A1* | 6/2019 | Dotan-Cohen | G06Q 10/107 |

\* cited by examiner

METHODS AND SYSTEMS TO SUPPORT ADAPTIVE MULTI-PARTICIPANT THREAD MONITORING

CROSS REFERENCE TO RELATED APPLICATIONS

This application is related to the following applications: U.S. Non-provisional patent application Ser. No. 15/396,503, entitled "Distributed Natural Language Message Interpretation Engine," by Alston Ghafourifar, filed Dec. 31, 2016; U.S. Non-provisional patent application Ser. No. 15/396,481, entitled "Context Management For Real-Time Event Awareness," by Alston Ghafourifar, filed Dec. 31, 2016; and U.S. Non-provisional patent application Ser. No. 15/859,140, entitled "Methods and Systems to Support Smart Message and Thread Notification and Summarization," by Alston Ghafourifar, filed concurrently with this application. Each of these related applications is incorporated by reference in its entirety.

TECHNICAL FIELD

This disclosure relates generally to apparatuses, methods, and computer readable media for improved interaction of users with receipt and response to multi-protocol message events. More particularly, this disclosure relates to providing a communication system to analyze multi-user message activity to provide contextual conversational information for multi-party message threads. The conversational awareness being determined, in part, by analyzing contents of individual messages and their relationship to other messages using a history and knowledge base of the other messages.

BACKGROUND

Modern consumer electronics are capable of enabling the transmission of messages using a variety of different communication protocols. More specifically, text messages (such as SMS/MMS, Instant Messages (IMs), etc.) and emails represent the vast majority of direct communications between users. Each of these mechanisms support electronic exchange of information between users or groups of users. In some cases, information is simply "posted" and may not be directly related to any particular message thread. In other cases, information may be directed to a user such that a "reply" or further communication is expected. In short, today's technologies provide a multi-protocol input of information to users and it is largely up to the recipient to determine what to do with the information (e.g., comment, reply, ignore, pass on to another party).

One problem associated with existing (and possibly future) methods of exchanging messages between parties is that messages are received in a largely stand-alone fashion. Using today's available communication techniques, each individual message lacks a context relationship with other messages and does not take into account a conversational awareness to present to the user. At best, messages may represent a thread of related communications that are only connected to each other because of a common subject line. Further, often in a long thread of messages (e.g., many distinct messages under the same subject line), becomes less relevant to a particular subject as the topics in the body of the messages change to different topics. In cases where there are multiple participants in a given thread of messages the communications may evolve through many different topics. That is, a message may be sent to a group of people, and as different people in the group contribute to the message thread, they may change the direction of the topic being "discussed" in the messages. Using current techniques, a user is not given any indication of the changes in topic over time.

Further, different groups of people interact differently in different sized groups. In a small group of four people, everyone may feel comfortable with contributing to the discussion. However, these same four people within a larger group (e.g., 16 people) may feel less inclined to join in and submit messages to the thread. This dynamic may increase as the number of people in the group increases. Alternatively, some people, for a variety of different reasons, may not be intimidated or reserved within a large group message thread and "contribute" more often than others. Sometimes, the people that contribute more often offer important information for the group, while other times, people "contribute" non-important information and feel compelled to put messages into the thread. Current techniques of multi-party communications do not have any way to classify or differentiate these different types of users or classes of user behavior. This can lead to each participant in the thread being treated similarly in terms of how messaging applications may notify, display, remind, and otherwise indicate the messaging activity in a given group conversation to a given user participant. Additionally, sometimes the thread splinters into groups of people discussing different topics that not everyone may be genuinely participating in nor care about. This divergence may be related (or caused by) the length of time that a particular message thread is active and the number of active participants. The longer a message thread is active the more likely it may be to diverge and the context of the messages may be more accurately representative of multiple smaller and shorter communications hidden within the context of the larger and longer message thread. It would be beneficial to provide users visibility into this situation to make them more productive and efficient when dealing with long (as in time) and large (as in number of participants and/or number of messages) message threads. Similarly, it would be beneficial to provide a system with visibility into this information so as to enable predictive analytics, machine learning, and other data processing techniques to discover behavior patterns which may be of value to a given user or group of users in a given conversation.

Another problem associated with today's messaging techniques is their relative inability to provide relevant predictive and reactive solutions to a user's messages based on the way different users interact in multi-participant message threads. Generally, the user's type of interaction within the thread is completely ignored when messages are delivered. If a user's interaction history were taken into account, it may be possible to provide a visual indication to other users of the importance or non-importance of portions of the thread. Further, a visual indication may alert a user to splintered conversations within a larger communication stream. Recognition of these situations and determination of visual clues for users may be performed using the techniques of this disclosure.

The subject matter of the present disclosure is directed to overcoming, or at least reducing the effects of, one or more of the problems set forth above. To address these and other issues, techniques that process a multi-participant message thread based on the content of individual messages and attributes of different participants are described herein. Disclosed techniques also allow for grouping of messages into chunks of messages more related to each other than other messages in a message stream. Additionally, disclosed techniques allow for providing visual clues, via an interface to users participating within these multi-participant threads, to increase user's awareness to the above described occurrences.

BRIEF DESCRIPTION OF THE DRAWINGS

Embodiments described herein are illustrated by examples and not limitations in the accompanying drawings, in which like references indicate similar features. Furthermore, in the drawings some conventional details have been omitted so as not to obscure the inventive concepts described herein.

DETAILED DESCRIPTION

Figure 1:
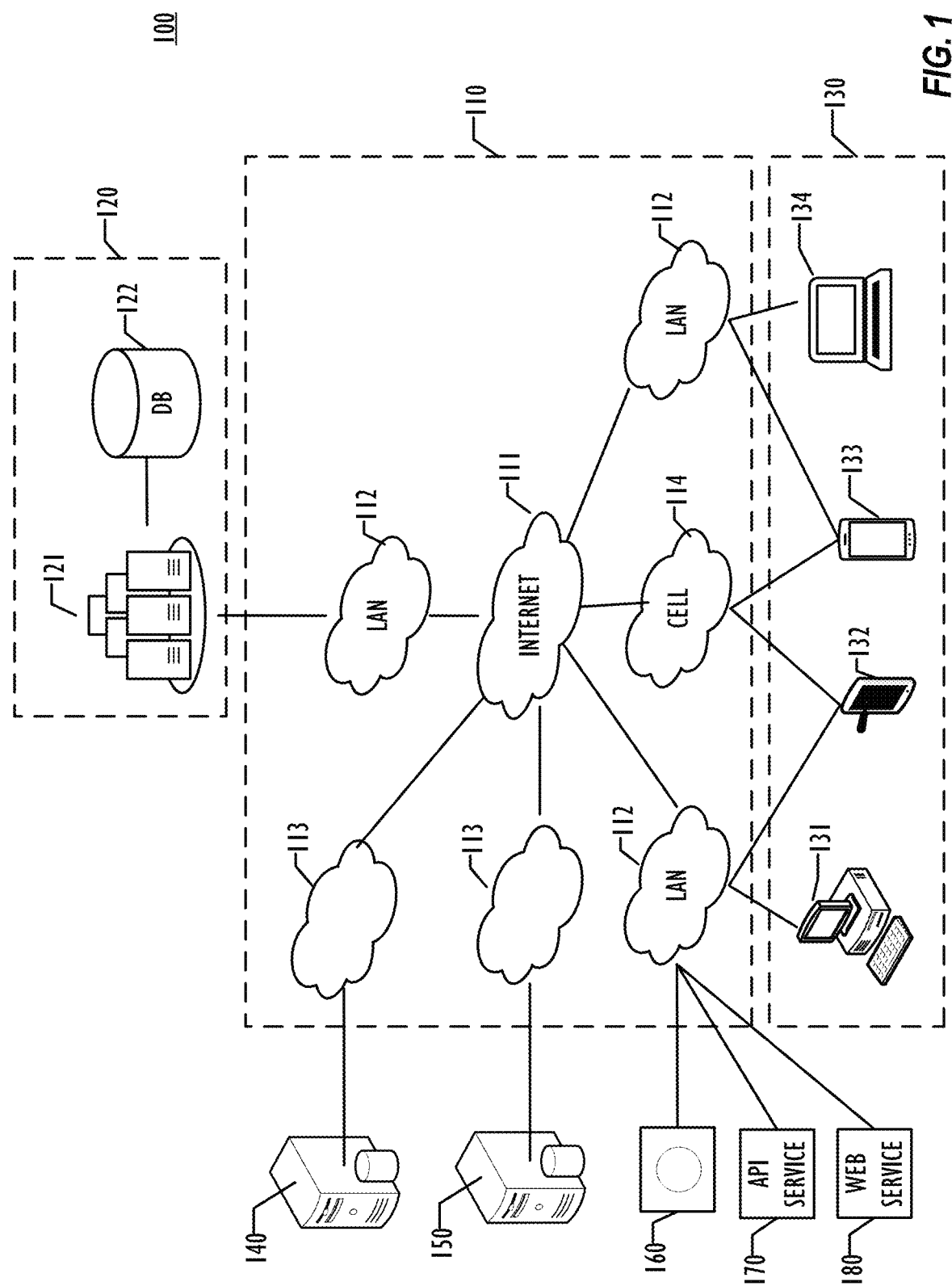
FIG. 1 illustrates, in block diagram form, an exemplary architecture 100 that includes electronic components for servicing message transmission and analysis in accordance one or more embodiments.

Disclosed are apparatuses, methods, and computer readable media for improved message presentation to a user with respect to correlation of messages in a multi-participant message thread. Conversational awareness may be determined by analyzing contents of individual messages and assigning them to an existing context or creating a new context. Association of messages to contexts allows for grouping related messages related to their subject matter. Further, analysis of individual users within a multi-party communication stream (e.g., a thread with a group of participants) can be used to report previous and predict future user activity of a specific user. Groups of different sizes have been determined to sometimes have different participation dynamics. For example, people communicate differently in small groups versus large groups. Examples of group sizes include small with 3-5 participants, medium with up to 16 participants, and large having more than 16. Disclosed systems learn and leverage this communication dynamic.

As used herein, an "entity" refers to a person (e.g., a user, another user, etc.), an organization (e.g., a corporation, a non-profit company, etc.), a service (e.g., a ride sharing service, social media), or any other identity responsible for initiating a message directed to a user.

User participation within a multi-participant conversation, either electronic or verbal, has been noticed to follow several different paradigms. Some of these paradigms are affected by a comfort level of the participant, their knowledge level of a subject at a given time (e.g., time within the communication stream), and their role within the group (e.g., boss or subordinate, technical lead or individual contributor, etc.). Three example paradigms that may be used to illustrate these concepts include, the team-meeting paradigm, the conference-room paradigm, and the all-hands meeting paradigm. There exist more situations than these three example paradigms, but, for simplification only these three will be explained in more detail here. These three examples are selected because they can be confined to a "business" relationship between participants that is well understood and useful as an example. Other, more complicated relationships, such as level of friendship, familial relationship, etc. can also affect multi-participant thread participation. Accordingly, those more complicated relationships may present other paradigms of multi-participant thread communication. This disclosure addresses automatically identifying participation information within a multi-participant thread to provide a benefit to users participating in the thread regardless of the underlying paradigm affecting user participation.

The team-meeting paradigm is used to explain how participants that have a close business relationship may interact when in a medium to small group such as a team assigned to a project (e.g., less than 15 people or so). The conference-room paradigm illustrates a slightly larger group and includes additional levels of "role within the organization" including higher level management participation. The all-hands meeting paradigm is used to discuss a meeting with a large number of people that may be considered less interactive but still have "open" participation rules. A meeting where a presentation is taking place (e.g., speaker presentation to an audience) is another example of a single person dominated meeting that resembles the interaction of an all-hands meeting.

In a team meeting there is typically a small group of people that work closely with each other on a day to day basis. As a result, participation of all team members is expected and regularly takes place. People will provide their input freely when they feel it will benefit the group. The same dynamic may exist for a multi-participant thread and balanced participation from all users on the thread may take place. Of course, there is no guarantee that there will be balanced participation. However, disclosed systems may monitor a multi-participant thread and determine the type of interaction taking place. Once determined, the system may predict future communications based on the determined dynamic. As will be explained further below, a small group of people may participate in a larger group as if they were behaving as in the team meeting paradigm. This may be the case when there is a large group monitoring the thread and a small group participating and providing messages. These people may be more knowledgeable about the subject matter and therefore "take the lead" in providing and commenting on information (e.g., message in the multi-participant thread).

In a conference room meeting, for the purposes of this example, there is a larger group of people than in the team-meeting paradigm. For this example, we may consider that there will be managers and individual contributors present and more "levels" of management than are present in the team-meeting paradigm. Because of the presence of additional management, people at the meeting that are individual contributors may feel like they should keep quiet (e.g., send no messages in the multi-participant thread case). However, if an individual contributor is very knowledge able about a topic that is currently being discussed they will typically contribute. In this example, the conference room meeting is expected to take place for a period of time and progress from one subject to another over that duration. Each of the periods of time where a particular subject is being discussed may be thought of as "chunks" of a larger exchange of information (i.e., the whole meeting). Thus, individual contributors may participate in some chunks while remaining silent during chunks that are not completely related to them. Of course, this may not always be the case but appears likely. Disclosed systems may monitor a multi-participant thread and identify "chunks" and consider the participants of the chunks such that it may be identified and separated out of the totality of messages within a multi-participant message thread. The context of the different messages (e.g., subject matter and relationship), participant information, and participation metrics may be used to identify these chunks. User interfaces may be enhanced to leverage information about chunks and provide different views into a multi-participant message thread.

In the all-hands meeting paradigm, a leader is presenting information to a very large audience with limited audience participation. For example, a CEO may be giving a year-end report to all employees and may allow for a question and answer period. Because of the environment around this type of meeting, many people will be strictly silent and not provide any comments or questions at all. This may also be the case, possibly to a lesser degree, when a speaker is presenting a slide presentation to a group. In each of these cases, there may exist a common participation rate in a multi-participant message thread. Disclosed systems may determine which participants are "active" participants and which are merely passive participants and adjust system resources and priorities based on that determination. In short, an adaptive multi-participant thread monitoring system may be able to monitor and predict activity of users and determine how each individual user may be expected to participate within the thread. Further, chunks of information may be identified and grouped using an interface that provides visual clues as to subject matter of the chunks and access to messages that make up a given chunk. Still further, user participation metrics may be maintained for users across multiple multi-participant threads and used as part of the predictive engine. This last quality is based, in part, on the concept that people will act in a consistent manner with their piers so if they are very active in a thread of 60 people they may be expected to be active in a thread of 30 people for example. Also, it they are in two different multi-participant threads and there is significant overlap between the members of the two threads they may have a predictable participation metric for the second thread because of previously monitored participation in the first thread. Other predictive capabilities are possible. Further discussion and examples of these paradigms and chunking are discussed below with reference to FIGS. 4A-B.

Referring now to FIG. 1, a network architecture infrastructure 100 is shown schematically. Infrastructure 100 includes computer networks 110, interaction platform devices included in a messaging infrastructure 120 (e.g., devices implementing an adaptive multi-participant thread monitoring infrastructure according to one or more disclosed embodiments), client devices 130, third-party communications devices 140, third-party service provider devices 150, smart devices 160, third-party 'API-enabled' services 170, and third-party 'Web-enabled' services 180. Note that devices may be either physical or virtualized and may run on dedicated hardware or exist dynamically in the cloud.

The computer networks 110 may include any communications network that allows computers to exchange data, such as the internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the messaging infrastructure 120, the client devices 130, the third-party communications devices 140, the third-party service provider devices 150, the smart devices 160, the third-party 'API-enabled' services 170, and the third-party 'Web-enabled' services 180) via hardware elements such as gateways and routers (not shown).

Messaging infrastructure 120 may include one or more servers 121 and one or more storage devices 122. The one or more servers 121 may include any suitable computer hardware and software configured to provide the features disclosed herein. Storage devices 122 may include any tangible computer-readable storage media including, for example, read-only memory (ROM), random-access memory (RAM), magnetic disc storage media, optical storage media, solid state (e.g., flash) memory, etc.

Client devices 130 may include any number of computing devices that enable an end user to access the features disclosed herein. For example, client devices 130 may include, for example, desktop computers 131, tablet computers 132, mobile phone 133, notebook computers 134, etc.

Third-party communications devices 140 may include email servers such as a GOOGLE® Email server (GOOGLE is a registered service mark of Google Inc.), third-party instant message servers such as an Instant Messaging (IM) serve, third-party social network servers such as a FACE-BOOK® or TWITTER® server, cellular service provider servers that enable the sending and receiving of messages such as email messages, short message service (SMS) text messages, multimedia message service (MMS) messages, or any other device that enables individuals to communicate using any protocol and/or format.

Third-party service devices 150 may include any number of computing devices that enable an end user to request one or more services via network communication. For example, cloud-based software as a service (SAAS) or platform as a service (PAAS) providers and the applications they make available via the cloud. Smart devices 160 may include any number of hardware devices that communicate via any of the computer networks 110 and are capable of being controlled via network communication. Third-party 'API-enabled' services 170 may include any number of services that communicate via any of the computer networks 110 and are capable of being controlled via an Application Programming Interface (API), such as a ride-sharing service. Third-party 'Web-enabled' services 180 may include any number of services that may have no direct third-party interface, other than informational content, e.g., information hosted on a third-party website or the like, such as a train schedule, or a news feed.

The disclosed conversationally aware messaging infrastructure 120, therefore, can represent improvements to computer functionality. For example, the advantages of a messaging infrastructure described herein can assist with enabling users to better relate incoming messages to other messages within a multi-participant thread of messages. This more informative context association may result in a reduction in the number follow up messages and make overall communication more efficient. That is, a thread monitoring system can assist with reducing wasted computational resources (e.g., computational resources that would otherwise not be necessary due to inefficient communications, etc.). The disclosed messaging infrastructure 120 may also integrate information from one or more of the many different types of messaging protocols and reduce time and confusion of users when dealing with multiple communication threads simultaneously. As described in further detail below, at least one embodiment of an adaptive multi-participant thread monitoring system can be implemented using software, hardware, or a combination thereof.

Figure 2:
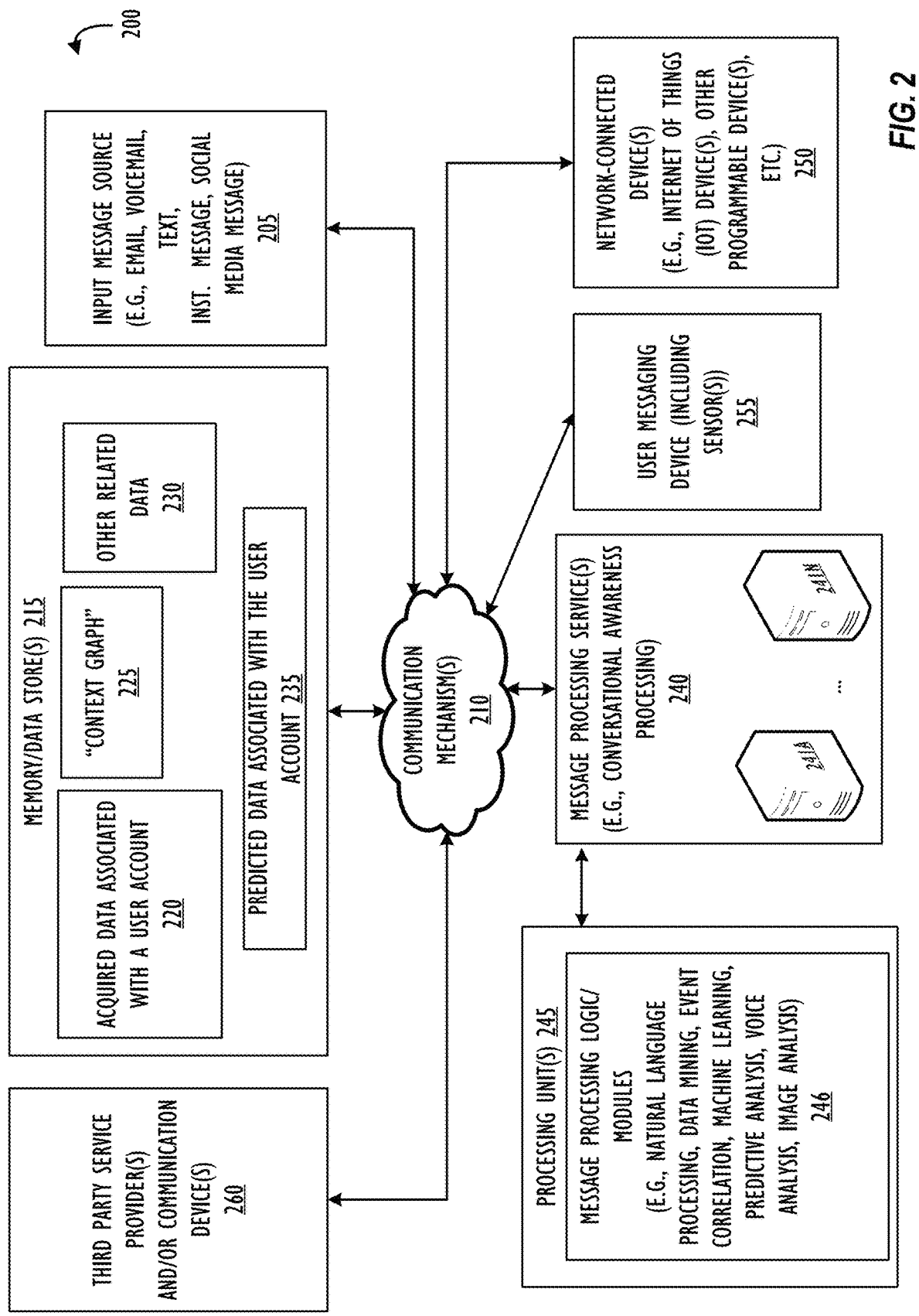
FIG. 2 illustrates an exemplary communications server infrastructure 200 configured to analyze and correlate messages to provide conversational awareness to multi-participant message threads, according to one or more embodiments disclosed herein. The infrastructure 200 may be used to support an adaptive multi-participant tread monitoring system as described herein.

Referring now to FIG. 2 which illustrates, in block diagram form, an exemplary communications server infrastructure 200 configured to analyze and correlate messages to provide improved user interaction, according to one or more embodiments disclosed herein. The infrastructure 200 may be used to support an adaptive multi-participant thread monitoring system as described herein. For one embodiment, the architecture 200 may include processing unit(s) 245, memory or data store(s) 215, third (3rd) party service provider(s) and/or communication device(s) 260, user messaging devices 255 (possibly including sensor(s) such as GPS or accelerometers), input messages sources 205, communication mechanisms 210, message processing service 240, and network-connected device(s) 250. For one embodiment, one or more components in the architecture 200 may be implemented as one or more integrated circuits (ICs). For example, at least one of processing unit(s) 245, communication mechanism(s) 210, 3rd party service(s)/device(s) 260, user messaging devices 255, network-connected device(s) 250, or memory 215 can be implemented as a system-on-a-chip (SoC) IC, a three-dimensional (3D) IC, any other known IC, or any known IC combination. For another embodiment, two or more components in architecture 200 are implemented together as one or more ICs. Each component of architecture 200 is described below. Message processing service 240 includes one or more computer devices 241A through 241N configured to perform the functions described herein for maintaining contexts, processing messages, creating groups of messages, and identifying sub-conversations within a larger group communication that are based on the content and context of received messages.

Processing unit(s) 245 can include, but are not limited to, central processing units (CPUs), graphical processing units (GPUs), other integrated circuits (ICs), memory, and/or other electronic circuitry. For one embodiment, processing unit(s) 245 manipulates and/or processes data (e.g., data associated with user accounts, data associated with messages, data comprising contexts and events, data associated with processing operations/algorithms/techniques, etc.). Processing unit(s) 245 may include message processing modules/logic 246 for servicing messages and user interaction with respect to messages in accordance with one or more embodiments. For one embodiment, message processing modules/logic 246 is implemented as hardware (e.g., electronic circuitry associated with processing unit(s) 245, circuitry, dedicated logic, etc.), software (e.g., one or more instructions associated with a computer program executed by Processing unit(s) 245, software run on a general-purpose computer system or a dedicated machine, etc.), or a combination thereof.

Message processing modules/logic 246 can be employed in cooperation with one or more message processing service(s) 240 and a context graph 225 to perform tasks on behalf of users. Message processing modules/logic 246 may be part of a computing system (e.g., a laptop, server, a virtual machine, a programmable device, any other type of computing system, etc.) capable of processing user messages. User messages can be provided to architecture 200 in the form of user inputs messages from an input messages source 250. Messages may be received from a user messaging device 255 over a network via communications mechanisms 210. Further, data from third party service providers 260, network connected devices 250, and sensors from different devices may also be made available via communication mechanisms 210. Information from this additional data may be used to form or add to a context as maintained in context graph 225 to assist with implementation of embodiments as disclosed herein.

Message processing service 240 can obtain or receive any type of data associated with servicing user messages received in a plurality of message protocols. This data includes digitalized data representing one or more activities associated with a user account. The data can, for example, also include data stored in memory/data store(s) 215. For one embodiment, and as shown in FIG. 2, this data can include acquired data 220 and/or predicted data 235. As used herein, "acquired data" refers to historical and current data about subjects identified in one or more messages for a given user account. The data can optionally also include predicted data 235, which refers to data resulting from processing acquired data. For yet another embodiment, the data includes information from one or more of provider(s)/device(s) 260, network-connected device(s) 250, and sensor(s) in a user messaging device 225.

One difference between acquired data 220 and predicted data 235 is that the acquired data 220 represents "hard data." That is, the data 220 is known with a high degree of certainty, such as records of past activities or a record of current activity. Acquired data 220 can refer to any or all attributes of activities (and messages) associated with a user account. Exemplary data 220 includes, but is not limited to, the following: image data from posted or sent images, data culled from message subjects, bodies, and attachments, news feed information, voice messages processed to determine content, etc. For some embodiments, the acquired data 220 can be obtained from 3rd party service provider(s) 260, a social networking service, a weather reporting service, a calendar service, an address book service, any other type of service, or from any type of data store accessible via a wired or wireless network (e.g., the Internet, a private intranet, etc.).

On the other hand, predicted data 235 may be considered "soft data." That is, predicted data 235 includes data about future activities associated a user or data mined and processed with machine learning techniques. For one embodiment, predicted data 235 represents the result of performing at least one of the following: (i) data mining acquired data 220; (ii) analyzing acquired data 220; (iii) applying logical rules to the acquired data 220; or (iv) any other known methods used to infer new information from provided or acquired information. For example, acquired data 220 may include a user's interactions with another user or within a group as in a multi-participant thread, while predicted data 235 may include predictions about how a user might respond to a received message. For this example, the data about the user's interactions within the multi-participant thread may be combined with other acquired data 220 (e.g., participation of user in a different thread, etc.) and processed to make the prediction.

Referring again to FIG. 2, message processing service 240 uses acquired data 220 and/or predicted data 235 to generate and maintain context graph 225. As shown in FIG. 1, all or some of context graph 225 can be stored processing unit(s) 245, memory 215, and/or the service(s) 240. As used herein, a "multi-dimensional context graph," a "context graph" and their variations refer to a multi-dimensional, dynamically organized collection of data used by message processing service 240 for deductive reasoning. For one embodiment, a context graph acts as a knowledge based system that includes a knowledge base and/or an inference engine for a neural network. Consequently, context graph 225 represents a dynamic resource that has the capacity to "learn" as new information (e.g., data 220, data 235, etc.) is added. Context graph 225, as a knowledge based system of a neural network, enables more than accessing information and extrapolating data for inferring or determining additional data—it can also be used for classification (e.g., pattern and sequence recognition, novelty detection, sequential decision making, etc.); and data processing (e.g., filtering, clustering, blind source separation and compression, etc.). As used herein, a "dimension" refers to an aspect upon which contexts may be related, classified, or organized. A dimension can be based on time, location, subject, event, or entity.

Context graph 225 may include multiple nodes and edges. Each node can represent one or more units of data (e.g., the acquired data 220, the predicted data 235, a combination thereof, a context, a message, an event, etc.). Each edge (which may or may not be weighted) can represent relationships or correlations between the nodes.

For one embodiment, each node represents a context. As used herein, the term "context" and its variations refer to a category of one or more messages or events. Events are described below. Conceptually, a context can be thought of as a container that holds one or more items such that each container includes only similar or related events. Contexts can have varying levels of granularity. Contexts may be differentiated based on their varying levels of granularity. For one embodiment, there are at least two distinct types of contexts that can be identified based on granularity levels—(i) a macro context; and (ii) a micro context. For example, macro contexts include broadly defined categories (e.g., meetings scheduled for a user, messages from a client, messages grouped at a corporate level, etc.), while micro contexts include more narrowly defined categories (e.g., messages referencing a specific task number, messages from a direct supervisor, etc.). Consequently, a macro context can include one or more micro contexts. For example, a macro context, which represents all of user A's messages with colleagues in California, USA can include micro context that represents all of user A's messages with colleagues in Palo Alto, Calif., USA. Context may also be differentiated based on their temporal properties. For one embodiment, there are at least two distinct types of contexts that can be identified based on temporal properties—(i) a current context (also referred to herein as "an open context"); and (ii) a previous context (also referred to herein as "a closed context"). Open contexts are on-going contexts that have not been resolved or closed because one or more future events can be included as part of the category. An open context can, for example, include messages relating to an ongoing task that User A is still working on and may have information about events that User A will perform at some future date, etc. Closed contexts are contexts that have been resolved. Examples of a closed context include context that is closed based on an activity (or stage of activity) being completed, a particular communication (e.g., text, phone call, email, etc.) that was received some time period in the past (tunable) for which there is no predicted or outstanding future activity. Furthermore, two or more contexts may include the same message or event—this is because a single message or event can categorized under multiple categories. In addition, contexts can be contingent upon one another. Consequently, and for one embodiment, each node in context graph 225 represents a category of one or more messages associated with a user account serviced by a message processing service. These categories may be used organize the data 220, 230, and/or 235 into manageable sets. Contexts can be perpetually created on an on-going basis. For one embodiment, contexts are never deleted. Instead, and for this embodiment, contexts are maintained as nodes in context graph 225 and can be retrieved by the message processing service 240 on an as-needed basis.

For one embodiment of context graph 225, edges between nodes represent relationships or correlations between the nodes. More specifically, a relationship or correlation between two contexts (which are represented as nodes) could be data (e.g., acquired data 220, predicted data 235, other data 230, an event, etc.) that is common to both contexts. For one embodiment, message processing service 240 uses the "hard data" to generate correlations or relationships between nodes (e.g., by generating a new edge between a pair of contexts represented as nodes in context graph 225, etc.). For a further embodiment, message processing service 240 uses the "soft data" to augment the generated correlations or relationships between nodes (e.g., by weighting previously generated edges between a pair of contexts represented as nodes in the context graph 220, etc.).

Architecture 200 can include memory/data stores 215 for storing and/or retrieving acquired data 220, other data 230, predicted data 235, and/or context graph 215. Memory/data stores 215 can include any type of memory known (e.g., volatile memory, non-volatile memory, etc.). Each of data 220, 230, 235, and 225 can be generated, processed, and/or captured by the other components in architecture 200. For example, acquired data 220, other data 230, predicted data 235, and/or the context graph 225 includes data generated by, captured by, processed by, or associated with one or more provider(s)/device(s) 260, service(s) 240, user messaging devices with sensor(s) 255, processing unit(s) 245, etc. Architecture 200 can also include a memory controller (not shown), which includes at least one electronic circuit that manages data flowing to and/or from the memory 215 The memory controller can be a separate processing unit or integrated in processing unit(s) 245.

Third party social network servers (205 and 260) such as a, cellular service provider servers that enable the sending and receiving of messages such as email messages, short message service (SMS) text messages, multimedia message service (MMS) messages, or any other device that enables individuals to communicate using any protocol and/or format.

Architecture 200 can include network-connected devices 250, which may include any number of hardware devices that communicate via any of the communication mechanism(s) 210 and are capable of being controlled via network communication. Examples of devices 250 include, but are not limited to, IoT devices, laptop computers, desktop computers, wearables, servers, vehicles, and any type of programmable device or computing system.

For one embodiment, Architecture 200 includes communication mechanism(s) 210. Communication mechanism(s) 210 can include a bus, a network, or a switch. When communication mechanism(s) 210 includes a bus, communication mechanism(s) 210 include a communication system that transfers data between components in architecture 200, or between components in architecture 200 and other components associated with other systems (not shown). As a bus, communication mechanism(s) 210 includes all related hardware components (wire, optical fiber, etc.) and/or software, including communication protocols. For one embodiment, communication mechanism(s) 210 can include an internal bus and/or an external bus. Moreover, communication mechanism(s) 210 can include a control bus, an address bus, and/or a data bus for communications associated with architecture 200. For one embodiment, communication mechanism(s) 210 can be a network or a switch. As a network, communication mechanism(s) 210 may be any network such as a local area network (LAN), a wide area network (WAN) such as the Internet, a fiber network, a storage network, or a combination thereof, wired or wireless. When communication mechanism(s) 210 includes a network, components in architecture 200 do not have to be physically co-located. When communication mechanism(s) 210 includes a switch (e.g., a "cross-bar" switch), separate components in architecture 200 may be linked directly over a network even though these components may not be physically located next to each other. For example, two or more of processing unit(s) 245, communication mechanism(s) 210, memory 215, and provider(s)/device(s) 260 are in distinct physical locations from each other and are communicatively coupled via communication mechanism(s) 210, which is a network or a switch that directly links these components over a network.

Figure 3A:
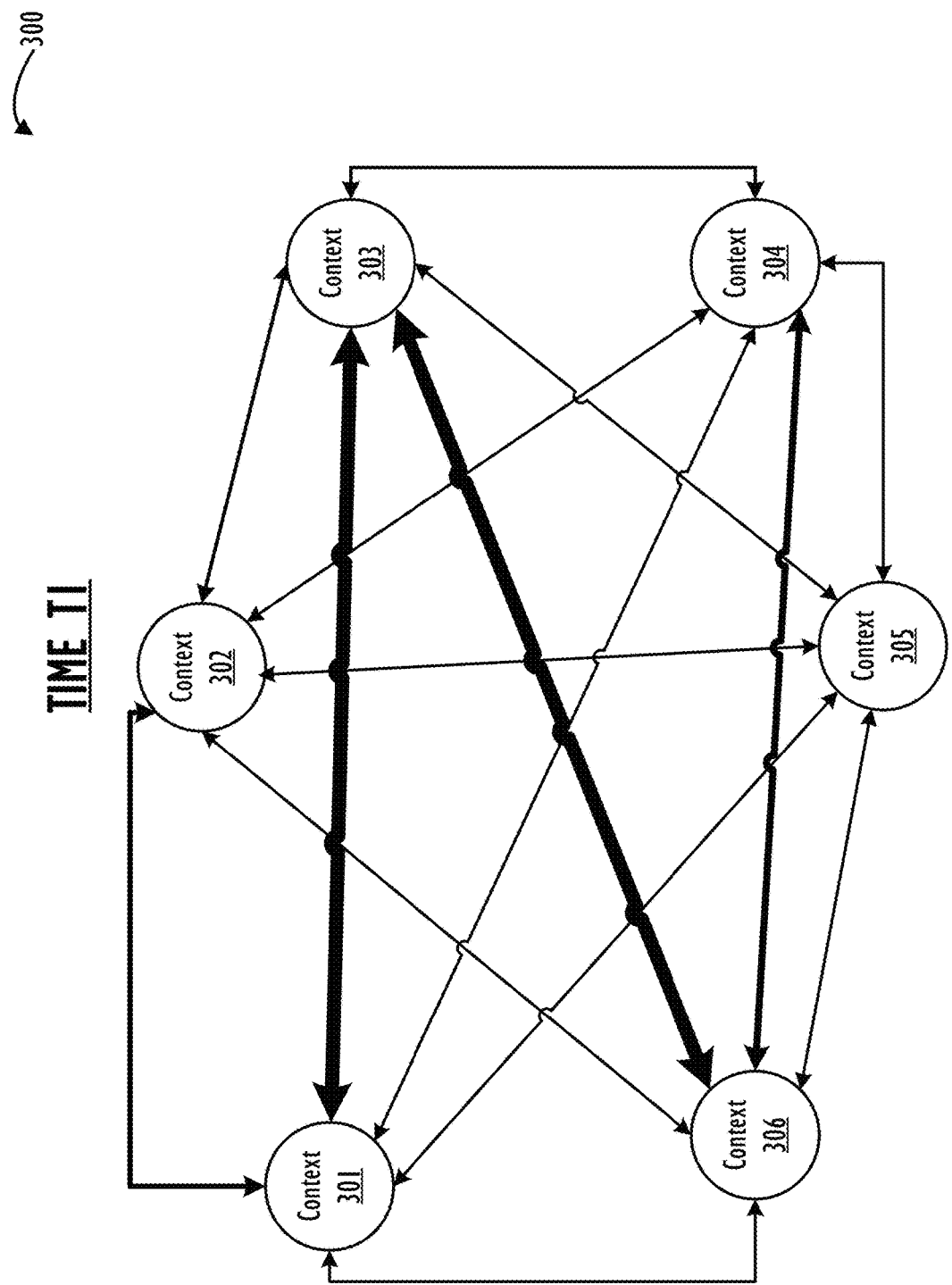
FIGS. 3A-C illustrate different stages of a two-dimensional ("2D") graphical approximation of a multi-dimensional context management graph ("context graph") 300 as it may change over time in accordance with one or more embodiments.
Figure 3B:
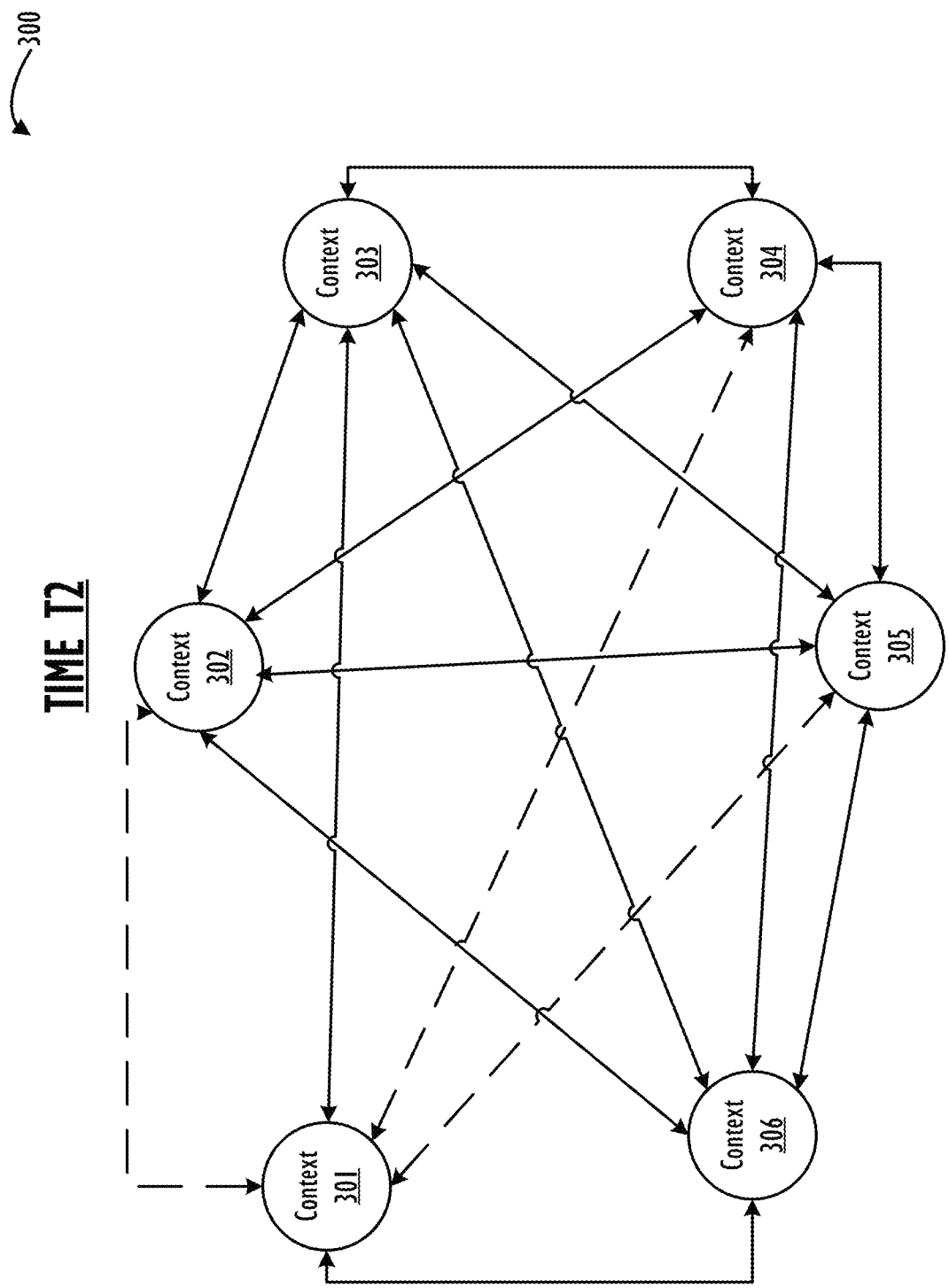
Figure 3C:
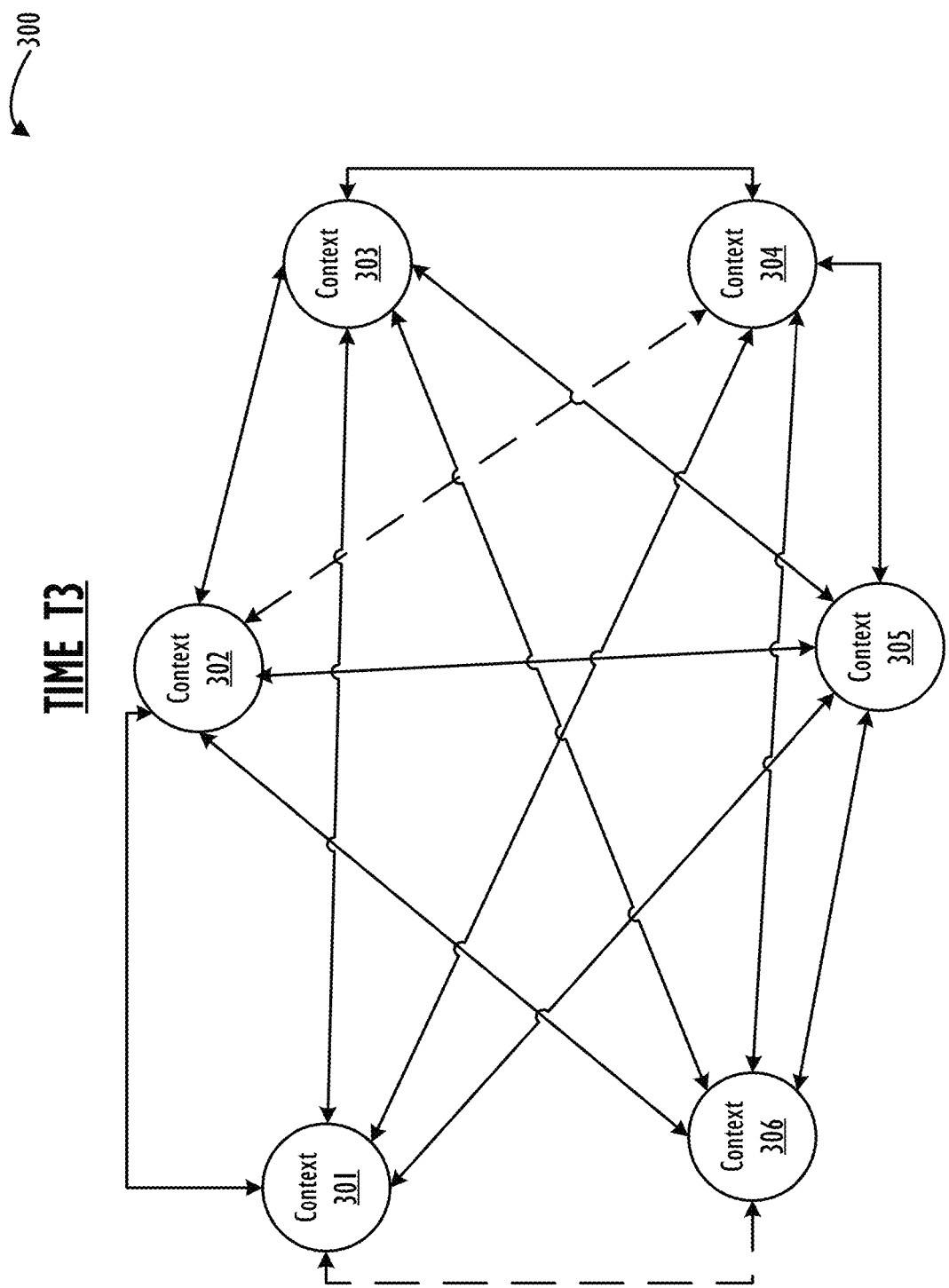

FIGS. 3A-3C illustrate, a 2D graphical approximation of an exemplary multi-dimensional context graph 300 at three different times T1, T2, and T3, in accordance with one embodiment. Here, T3 occurs after T2 and T1, and T2 occurs after T1. The exemplary context graph 300 in FIGS. 3A-3C can be generated and/or used by the embodiments of an adaptive multi-participant thread monitoring system as described herein (e.g., messaging infrastructure 120 described throughout this disclosure). Specifically, contexts within context graph 300 may be used to track correlations and relationships between individual messages to create "clusters" of related messages (sometimes referred to as "message chunks"). At a higher level contexts within context graph 300 may be used to track correlations and relationships of users to a multi-participant message thread. In general, context graph 300 represents a model for graphing items represented as nodes and relationships between those items using edges between nodes. When used to represent messages in a multi-participant message thread relationships of context graph 300 may be more static than other uses of context graph to represent relationships. That is, in part, because contents of historical messages will not change but may be affected by information in new messages. Relationships of users to a multi-participant thread may be more dynamic because a user's participation in the thread is not static and changes over time. In any case, context graph 300 represents a useful modeling tool to represent relationships and allows for maintaining information about both static and dynamic relationships.

With specific regard now to FIG. 3A, a 2D graphical approximation of an exemplary context graph 300 associated with a single multi-participant message thread at time T1 is illustrated. As shown, the context graph 300 includes one cluster of context ("context cluster") comprised of six contexts 301-306. As used herein, a "context cluster," a "cluster of contexts," and their variations refers to a group of one or more contexts that is based on a relationship between the set of messages in a multi-participant thread. In FIG. 3A, each of the contexts 301-306 in the context cluster of graph 300 represents an individual message and connections (i.e., edges) represent relationship between individual messages. It is to be appreciated that there can be any number of contexts (i.e., at least one context) in the context graph 300 and that the context cluster in graph 300 can include any number of contexts.

Context graph 300, shown in FIG. 3A, includes several edges between the nodes representing contexts 301-306. Each of these edges represents a correlation between its pair of nodes (e.g., messages). Furthermore, there can be different types of edges based on a degree of correlation between a pair of nodes (i.e., a pair of contexts representing messages in this example). Additionally, each of the edges can be weighted to show a degree of correlation between its pair of nodes. Correlations between the contexts 301-306 (i.e., the nodes 301-306 representing individual messages) in the graph 300 can be based on acquired data, relationships of messages, and/or predicted data. For one embodiment, one or more of acquired data, relationships, and/or predicted data is valued and combined to form the edge weight. For example, and as illustrated in FIG. 3A, the edges between one or more pairs of the contexts having differing thicknesses to show that the weighting of the correlations can be different.

Referring now to FIG. 3B, graph 300 is illustrated at time T2, which occurs after time T1. As time moves from T1 to T2, the data associated with the message relationship evolves (i.e., changes, increases, reduces, etc.) and data relating to subject matter of messages also evolves. As shown in FIG. 3B, three edges are now represented using dotted lines at time T2 (as opposed to being represented using solid lines at time T1) while all other edges are illustrated using solid lines at time T2. In FIG. 3B, the edges represented by the dotted lines are different from the edges represented by the solid lines. For example, a first pair of nodes that is linked using a dotted line (e.g., nodes 301 and 302, etc.) is less correlated than a second pair of nodes that is linked using a solid line (e.g., nodes 301 and 303, etc.).

With regard now to FIG. 3C, context graph 300 is illustrated at time T3. Time T3 occurs after T2 such that the data associated with the multi-participant message thread evolves (i.e., changes, increases, reduces, etc.) as time proceeds from T1 to T3. As shown in FIG. 3C, only two edges are now represented using dotted lines at time T3 (as opposed to three edges being represented using dotted lines at time T2) while all other edges are illustrated using solid lines at time T3. As explained above, the dotted and solid lines show that the differing relationships between pairs of nodes in context graph 300. For a first example, and with regard to FIGS. 3B-3C, the correlation between context 301 and context 306 at time T2 is different from the correlation between context 301 and context 306 at time T3. In addition, the other one of the two dotted lines indicates that context 302 is no longer correlated with context 304. For a second example, and with regard to FIGS. 3B-3C, the correlation between context 302 and context 304 at time T2 is different from the correlation between context 302 and context 304 at time T3.

As shown in FIGS. 3A-3C, data stored in a context graph (e.g., context graph 300) can and likely will evolve over time. That is, correlations between contexts (e.g., correlations between messages, etc.) can change over time to reflect changes in the subject matter of the messages. In a simple case, older messages may be less relevant when multiple newer message alters information about a subject in the message. This set of correlations can be used by the disclosed messaging infrastructure 120 to assist with improving the accuracy and efficiency of presenting thread information to a user.

Figure 4A:
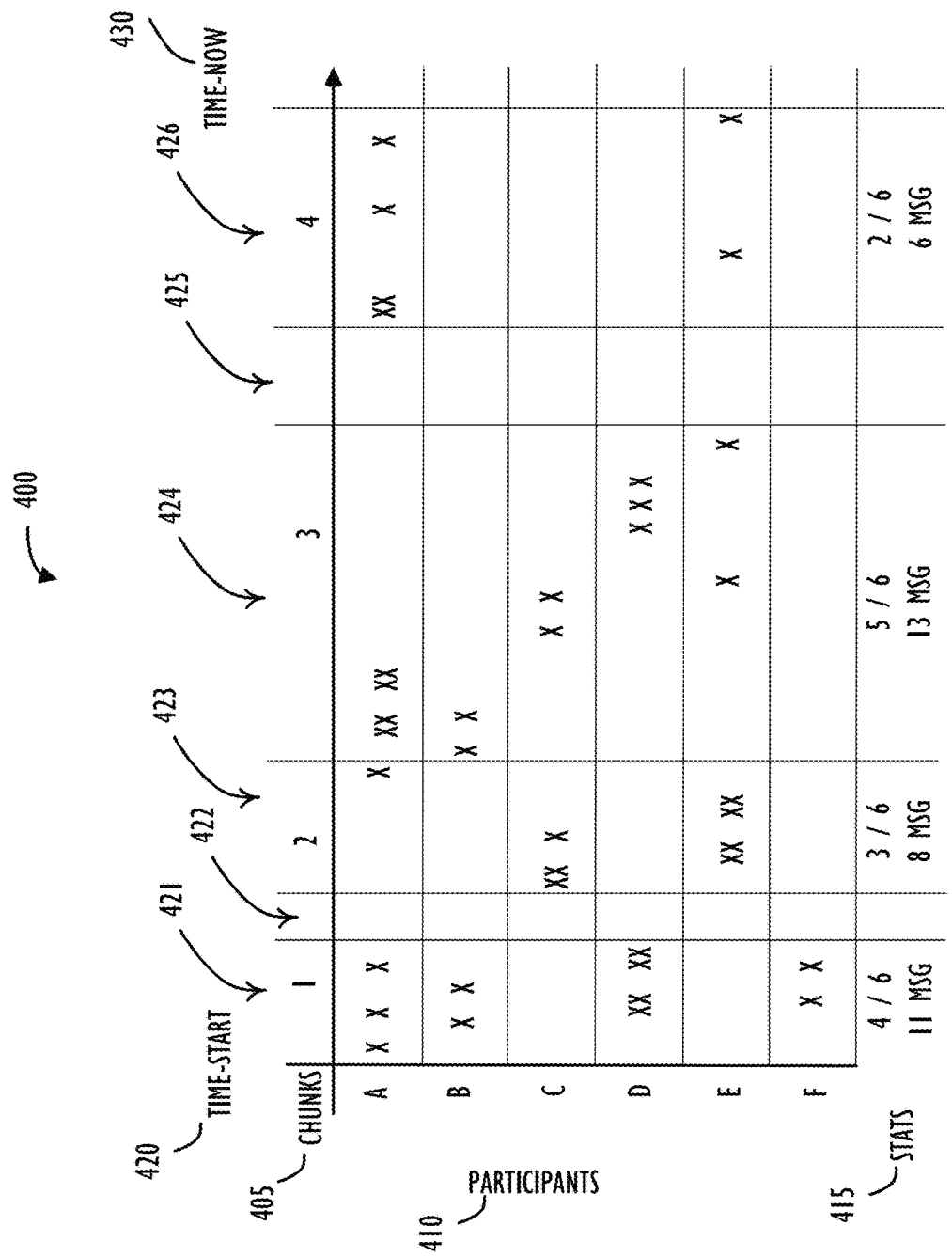
FIG. 4A illustrates a timeline 400 depicting participation and chunking of messages for a single message thread over distinct time periods for six participants (A-F) interacting using a multi-participant message thread, according to one or more disclosed embodiments.
Figure 4B:
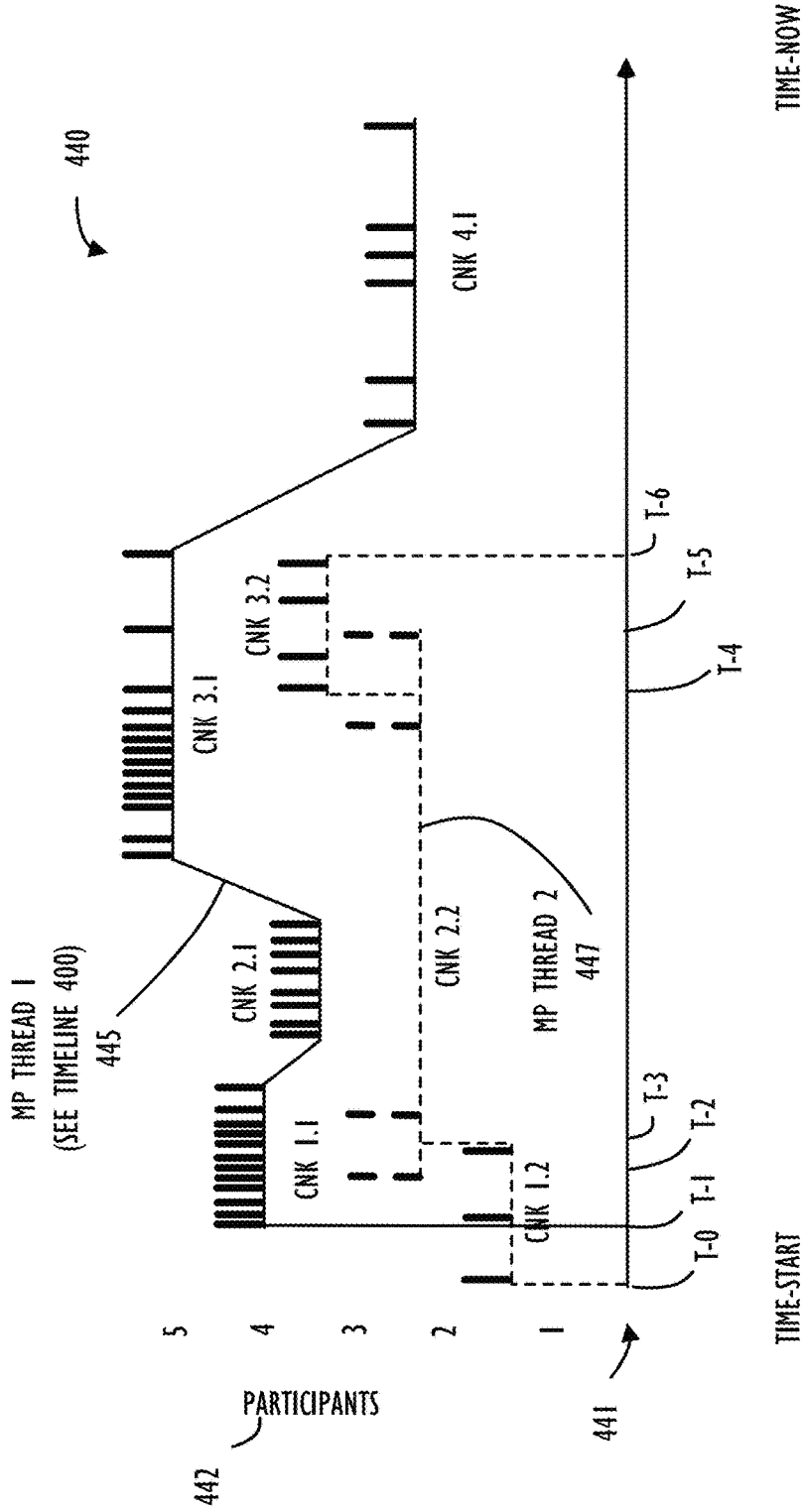
FIG. 4B illustrates graph representation 480 to reflect participation and chunking of messages for the single message thread of timeline 400 (i.e., MP THREAD 1 445) and an additional message thread (MP THREAD 2 447), according to one or more disclosed embodiments.

Referring to FIGS. 4A-B, FIG. 4A illustrates a timeline 400 depicting example participation and chunking of messages for a single message thread over distinct time periods for six participants (A-F) interacting using a multi-participant message thread, according to one or more disclosed embodiments. FIG. 4B illustrates graph representation 440 to reflect participation and chunking of messages for the single message thread of timeline 400 (i.e., MP THREAD 1 445) and an additional message thread (MP THREAD 2 447), according to one or more disclosed embodiments.

Beginning with timeline 400 of FIG. 4A, the top margin of the timeline 400 identifies chunks 405 as four individual chunks of messages. As explained briefly above, a chunk of messages represents a set of related messages that form a sub-set of all the messages within a multi-participant thread. For example, a sub-conversation about a specific topic discussed intermittently within the scope of a larger group of messages. The side margin of timeline 400 identifies six participants identified in this example as entities (e.g., users) A-F. The bottom margin of timeline 400 includes a statistics area for each of the identified chunks. For example, chunk 1 occurring at time portion 421 includes a total of 11 messages (each message represented by an 'X' in the grid) and participation of four out of the six total participants (i.e., A, B, D, and F). Time is represented as starting on the left of the grid at TIME-START 420 and continuing to the right of the grid at TIME-NOW 430. Time segments 421 and 425 represent individual periods of time where no messages are entered by anyone into this particular message thread. Time segment 423 is identified as chunk 2 where 8 related messages are entered by three of the six total participants. These three participants include participant A, who also was identified in chunk 1, and participants C and E. Time segment 424 includes chunk 3 with all but one of the six participants contributing at least one of the total 13 related messages. Finally, time segment 426 correlates with chunk 4 where only participants A and E provide messages. Timeline 400 and this graphical information about participation describe that information in a multi-participant message thread may evolve over time as the subject matter changes and the users participating in the thread changes. Timeline 400 may be considered to represent a multi-participant message thread conforming to the team-meeting paradigm discussed above where all members participate at some level. It is also possible, but not required, that user A may be the team leader because they participated in the more chunks than anyone else and they provide the first message or the last message of the majority of chunks. For example, they may be driving the discussion and closing off one topic (e.g., chunk) prior to initiating another.

Referring now to FIG. 4B, Histogram 440 illustrates two different multi-participant message threads that may occur during an overlapping time period. In Histogram 440, the total number of active participants 442 is shown on the left margin, time is represented by line 441 beginning at TIME-START and progressing till TIME-NOW with individual points in time labeled in sequential fashion from T-0 to T-6. MP Thread 1 (445 shown as solid line) is not exactly to scale but attempts to illustrate information consistent with timeline 400 of FIG. 4A. MP Thread 2 (447 shown as a dashed line) illustrates a separate MP thread. In MP Thread 1 (445), starts at time T-1 with four participants and eleven messages (each identified as short vertical bars) as part of chunk 1 for thread one (labeled as chunk 1.1 or chunk#.Thread#), next chunk 2.1 includes 8 messages and 3 participants, chunk 3.1 includes 13 messages and 5 participants, and chunk 4.1 includes 6 messages from 2 participants.

Transitioning to MP Thread 2 (447 shown as the dashed line), at time T-0 there is only one participant that sends three distinct messages that are related to each other and identified as chunk 1.2 (i.e., chunk1.thread2). These three messages of chunk one are not shown to be related to any other messages of the thread by their subject matter either because they are not related or they may not be able to be automatically related to other messages for some reason. Perhaps they are simply directives to perform research or simply messages telling people to do something they are already assigned to do. In any case, this is illustrative of the condition where a chunk may have only a single participant. Further, chunk 2.2 begins at time T-2, prior to the end of chunk 1.2, and includes four messages (each shown with a dash for further distinction on the graph) for two users. Chunk 2.2 illustrates that chunks within a given message thread may overlap in time and are not strictly segmented as they were in previous examples. Chunk 2.2 starts before the end of chunk 1.2 and continues past the beginning of chunk 3.2 (time T-4) until it ends at time T-5. Chunk 3.2 includes four messages from three participants and ends at time T-6 where, in this example, MP thread 2 (447) is illustrated as terminating. Of course, MP thread 2 (447) may not be terminated because a transition to zero participants could represent a condition where a long period of time lapses between messages in a thread. It is possible that a future message beyond time TIME-NOW could be added to MP thread 2 (447) but is not shown in this example. Disclosed embodiments may release resources dedicated to monitoring terminated or dormant threads but still maintain historical information for the case where the thread becomes active again or for using information learned about participants of that thread to predict their interaction characteristics in future different threads.

Figure 4C:
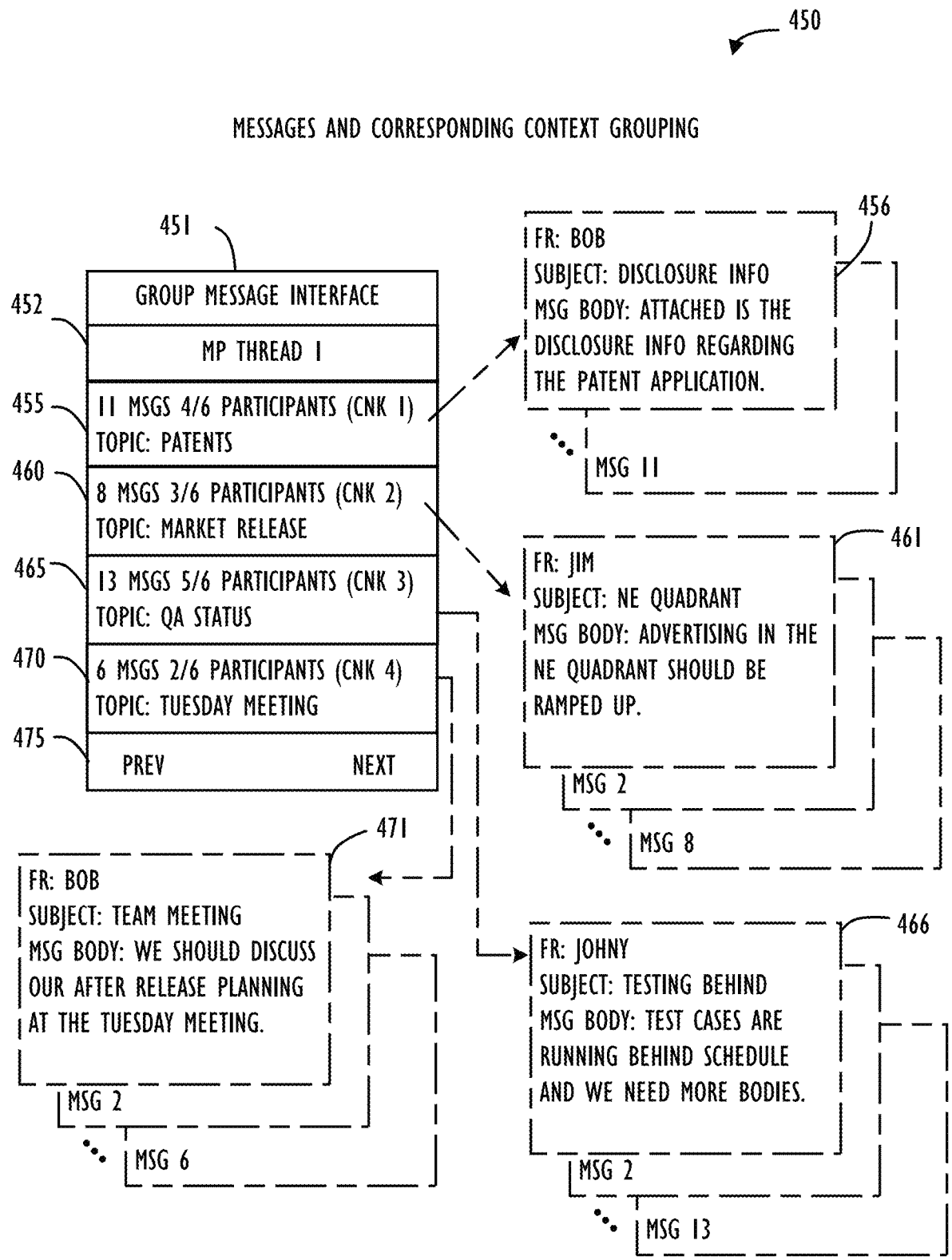
FIG. 4C illustrates a block diagram 450 showing a possible group message interface 451 to reflect participation and chunking of messages for the single message thread of timeline 400 (i.e., MP THREAD 1 445).

Referring now to FIG. 4C, block diagram 450 illustrates a possible group message interface 451 to reflect participation and chunking of messages for the single message thread of timeline 400 (i.e., MP THREAD 1 445). Block 452 indicates that the information currently being displayed relates to MP THREAD 1 and below this are areas for each of the sets of related messages (i.e., chunks). Block 445 provides information about the chunk (e.g., chunk 1) and includes a topic that relates the contexts into the chunk and identifies the number of messages and participation of the group (i.e., 4 of 6 in this example). Upon selection of block 455, the interface may be configured to transition to a view of the 11 messages in this chunk as indicated at blocks 456. Block 460 represents the second chunk of messages from MP THREAD 1 and would bring up the group of messages indicated at blocks 461 upon selection, for example. Blocks 465 and 466 relate to chunk 3 and blocks 471 and 471 relate to chunk 4. Block 475 presents a "previous" and "next" selection which could be selected by a user to transition to the next multi-participant thread (e.g., MP THREAD 2) to see context chunking, participation level, and topics for that thread.

Figure 5:
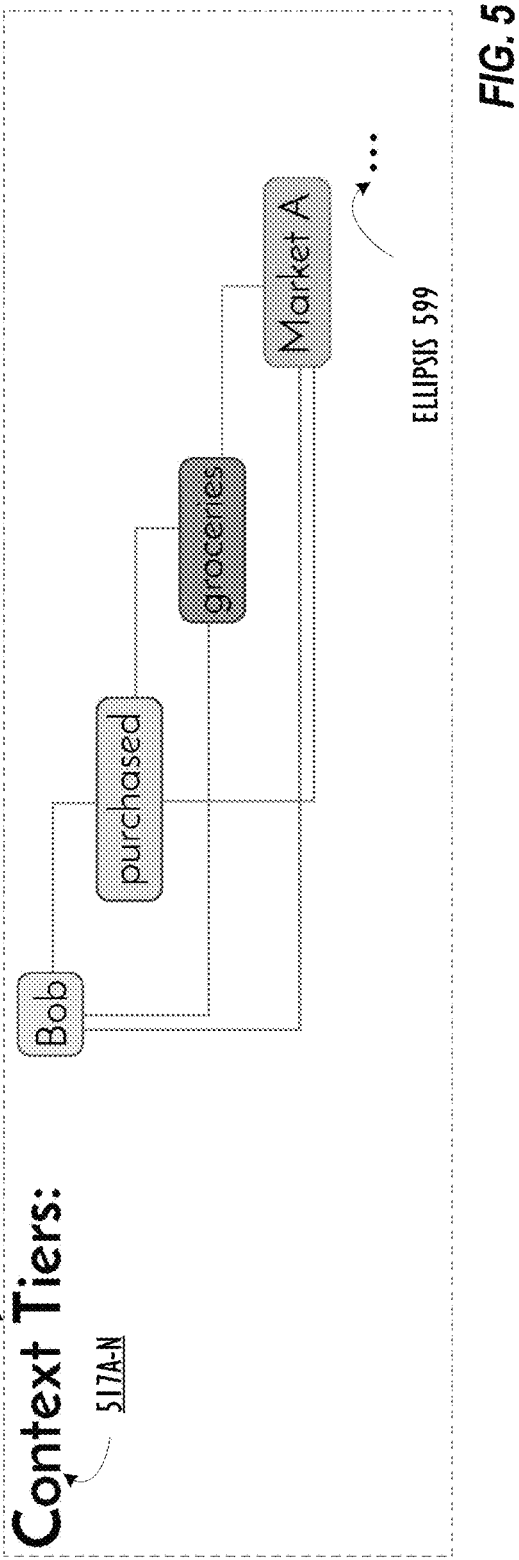
FIG. 5 illustrates one example message management technique 500 in accordance with one or more embodiments.

FIG. 5 illustrates a tiered message management technique 500 in accordance with one or more embodiments. Technique 500 can be performed by a message processing service (e.g., message processing service 240 described above in connection with FIG. 2, etc.). Technique 500 begins at operation 501, where a message is sent by another user and received by a message processing service. The event 513 includes text from the message and represents, in this example, activity associated with a user (e.g., user Bob shown in FIG. 5, etc.). For one embodiment, the messaging service receives the message 513 as a result of operation 501. For one embodiment, operation 501 may include the messaging service pre-processing the event 513 to convert the event 513 into a format that is usable by the messaging service. For example, the messaging service can format the event 513 into a data structure that is similar to context graph 300 used for representing relationships between messages.

Technique 500 proceeds to operation 502. Here, the messaging service can process event 513 to determine one or more key identifiers 515A-N associated with the event 513. These key identifiers can be parsed and ascertained via natural language principles and/or machine learning techniques implemented by the messaging service. As shown in FIG. 5, key identifiers 515A-N are encompassed by the rounded squares.

Next, technique 500 proceeds to operation 503. Here, the messaging service determines whether one or more of the key identifiers 515A-N is associated with a context of a different message. For example, each of the key identifiers 515A-N may be associated with a context that is represented as a node in a context graph, such that identification of the key identifier triggers identification of the corresponding context 517A-N within the context graph. For a first example, and for one embodiment, the key identifier "Bob" can trigger identification of a context associated with all messages sent by or referring to user Bob in a context graph. For a second example, and for one embodiment, the key identifier "purchased" can trigger identification of a relationship association all messages associated with purchasing items and/or services the context graph. If, for example, there is a single context already related to both Bob and purchasing, a more weighted relationship may be formed between this new message and that context. For a third example, and for one embodiment, the key identifier "groceries" can trigger identification of a context associated with all activities associated with groceries. For a fourth example, and for one embodiment, the key identifier "Market A" can trigger identification of a context associated with all messages making reference to Market A in the context graph.

For one embodiment, the messaging service organizes the identified contexts into a hierarchical context tier based on relative granularity levels of the contexts when compared to each other. Here, the messaging service can cache the at least some of the identified contexts and/or the generated context tier to retrieve or access the information without having traverse the context graph. This can, in some embodiments, assist with efficient utilization of computing resources and improve the accuracy associated with proper resolution of relationships between messages. This can also assist with intelligently grouping or chunking messages. For example, and as illustrated in FIG. 5, the messaging service can arrange the identified contexts in a tier such that the contexts are traversed in a sequential order. Conceptually, a context tier will include the more narrowly defined micro-contexts being stacked on top of the more broadly defined macro-contexts. As shown, the foundation tier is context "Bob", which includes all messages associated with user Bob. The penultimate level is the context "purchased", which includes all messages associated with both purchase and with user Bob. The level above the penultimate level is context "groceries", which includes all messages meeting all three criteria. The top-most level is context "Market A", which includes all messages meeting all four criteria. The ellipsis 599 in FIG. 5 shows that the messaging service can arrange any number of contexts associated with the event 513 into a context tier. In some embodiments, messages may be limited to a maximum of, for example, three tiers to allow for accurate relationship mapping and reduce processing resources. Of course, this limit could be tunable to allow for more system flexibility.

Figure 6A:
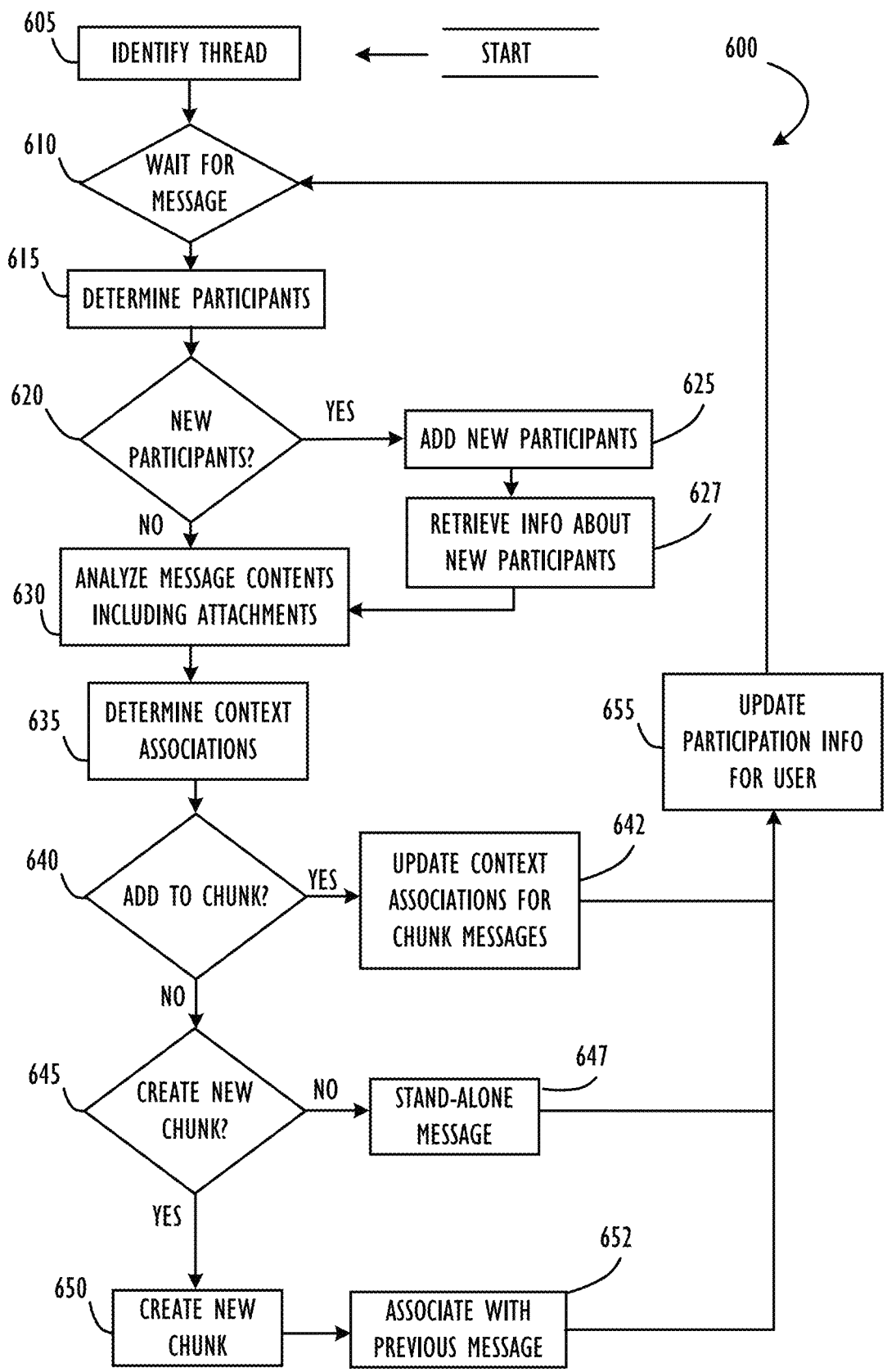
FIGS. 6A-B illustrate, in flowchart form, process 600 and 660 that may be used to analyze messages in a multi-participant message thread to provide participation and chunking information based, in part, on an individual messages context and a user's message thread participation information, in accordance with at least one embodiment.
Figure 6B:
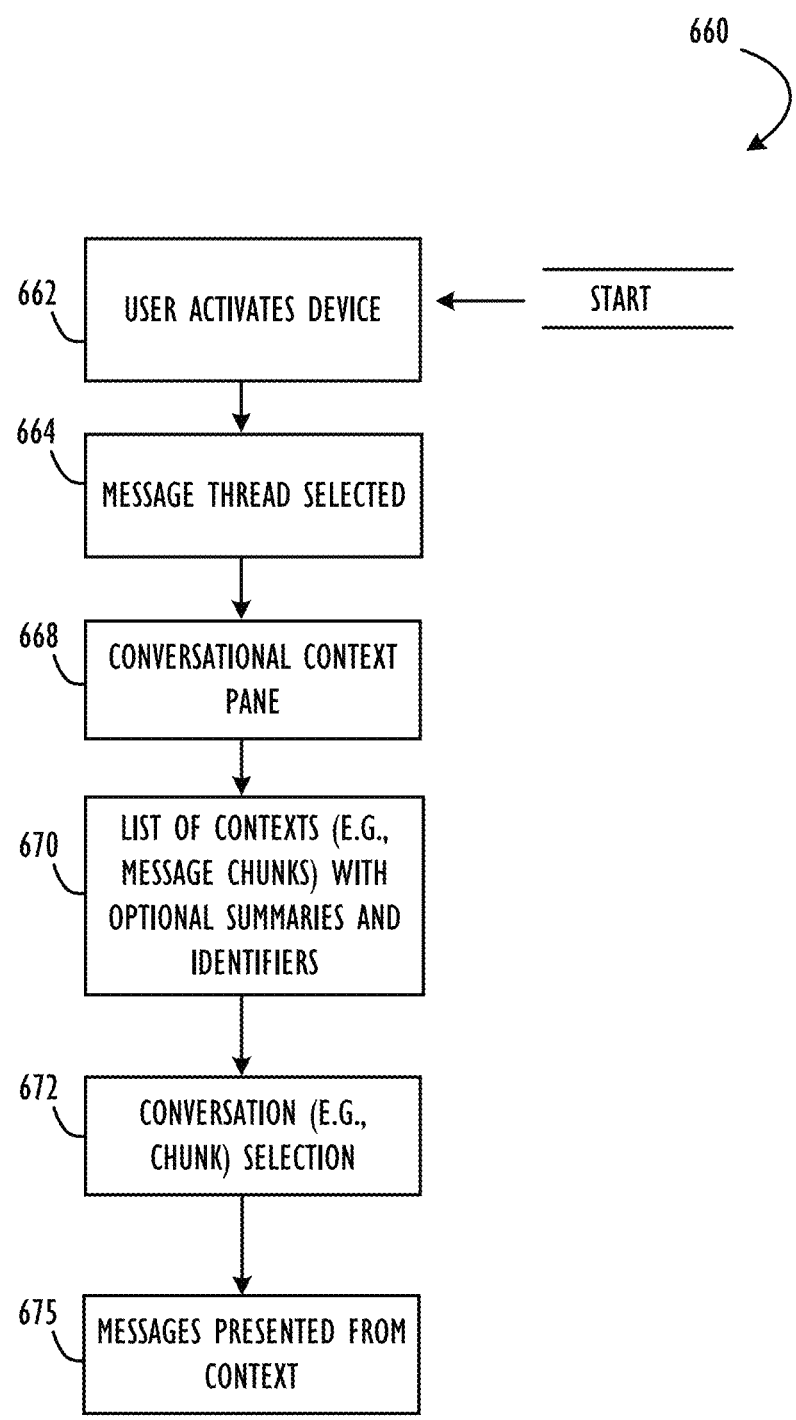

FIGS. 6A-B illustrate, in flowchart form, process 600 and 660 that may be used to analyze messages in a multi-participant message thread to provide participation and chunking information based, in part, on an individual messages context and a user's message thread participation information in accordance with at least one embodiment. Beginning at block 605, a message is received (e.g., at messaging service 240) and identified as being part of a multi-participant message thread. Decision 610 indicates that the system may wait for additional messages within the identified thread. Block 615 indicates that participants of the multi-participant thread are identified based on the received message. Decision 620 determines if new participants have been added to this thread and if so (the YES prong of 620) flow continues to block 625 where the new participants are added and tracked as part of this thread. Block 627 indicates that information about the new participants may be retrieved. This information could include personal information, identifying information, or historical information about how these users have interacted in previously monitored threads. Clearly, there will be new participants for any initial message being processed and people may be added to the thread throughout the lifecycle of the thread. If there are no new participants (the NO prong of 620) then this new message includes participants previously known to be associated with this thread. Block 630 indicates that the message and its contents including any attachments may be analyzed to determine a context for this message. That is, attributes of the message may be identified as described in FIG. 5 to determine a subject matter of the contents of the message. Flow continues to block 635 where based on the analysis performed an association to other contexts (e.g., other messages) may be performed and maintained in a context graph 300 for example. Decision 640 indicates that it may be determined based on the context associations if this message should be added to an existing chunk. If so (the YES prong of 640), flow continues to block 642 where context associations for messages already in the chunk may have their context associations updated to include the message being processed at this time. If it is determined to not add this message to an existing chunk (the NO prong of block 640), flow continues to decision 645 where it is determined if a new chunk should be created. If not (the NO prong of 645), flow continues to block 647 where the current message may be considered, at least for the time being, a stand-alone message. However, if this message warrants creation of a new chunk (the YES prong of block 650), for example, because it has been determined to be related to one or more previous stand-alone messages, then flow continues to block 650 where a new chunk is created. After creation of a new chunk, flow continues to block 652 where a chunk association with the one or more previous stand-alone messages may be created to include those messages and the new message within a chunk. All of blocks 642, 647, and 652 return flow to block 655 where participation information for the user sending the message being processed may be updated. Flow then continues back to Decision 610 to wait for another message in this thread.

Continuing to FIG. 6B, process 660 illustrates how a user may be presented with information as determined by process 600 for example. At block 662 a user activates a device configured to receive information from a multi-participant thread. For example, a smartphone, tablet, or laptop executing a messaging application. Block 664 indicates that a user may identify, e.g., via user interface selection, a multi-participant thread to obtain more information about that thread. Block 668 indicates that a conversational context pane (e.g., a display window) may be shown to reflect attributes of messages within the selected thread. Block 670 indicates that a user may be shown a list of contexts grouped together as message chunks with optional visual identifiers or summaries of the subject matter and participation info for the associated chunk. Block 672 indicates that the user may select a particular chunk as identified in the conversational pane. Block 675 indicates that actual messages that are associated with the selected context or chunk may be displayed. In this manner, the user may have access to messages using an access criteria based on the grouping methods as described throughout this disclosure. For example, a conversationally aware interface to multi-participant message threads (e.g., 451 of FIG. 4C) such that they may select a given sub-conversation from the overall content of the multi-participant message thread. In this manner, message processing service 240 has assisted in providing a more complete picture of information provided by a plurality of messages sent by a plurality of participants and their relationship to each other.

Figure 7A:
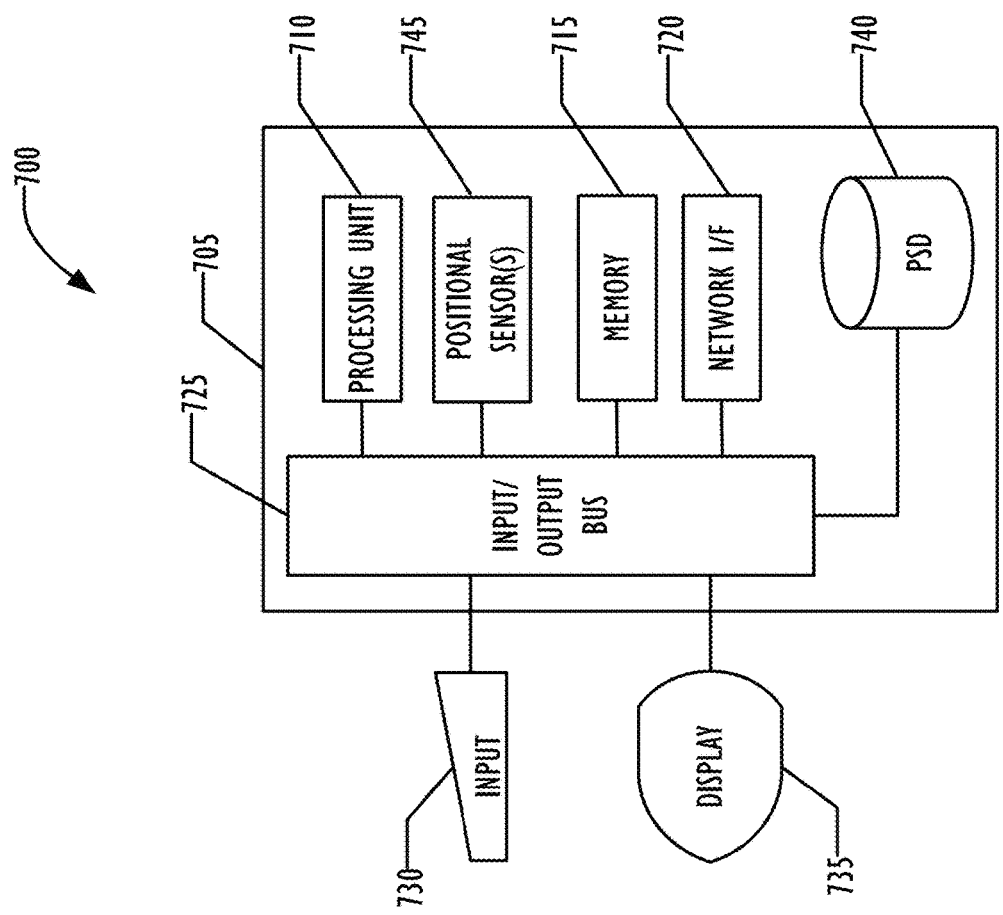
FIG. 7A is a block diagram illustrating a computing device 700, which could be used to execute the various processes described herein, according to one or more disclosed embodiments.

Referring now to FIG. 7A, an example processing device 700 for use in the communication systems described herein according to one embodiment is illustrated in block diagram form. Processing device 700 may serve in some of the devices shown in FIG. 1, e.g., a mobile phone 107, end user computer 103, sync server 105, or a server computer 106-109. Example processing device 700 comprises a system unit 705 which may be optionally connected to an input device 730 (e.g., keyboard, mouse, touch screen, etc.) and display 735. A program storage device (PSD) 740 (sometimes referred to as a hard disk, flash memory, or non-transitory computer readable medium) is included with the system unit 705. Also included with system unit 705 may be a network interface 770 for communication via a network (either cellular or computer) with other mobile and/or embedded devices (not shown). Network interface 770 may be included within system unit 705 or be external to system unit 705. In either case, system unit 705 will be communicatively coupled to network interface 770. Program storage device 740 represents any form of non-volatile storage including, but not limited to, all forms of optical and magnetic memory, including solid-state storage elements, including removable media, and may be included within system unit 705 or be external to system unit 705. Program storage device 740 may be used for storage of software to control system unit 705, data for use by the processing device 700, or both.

System unit 705 may be programmed to perform methods in accordance with this disclosure. System unit 705 comprises one or more processing units, input-output (I/O) bus 775 and memory 715. Access to memory 715 can be accomplished using the communication bus 775. Processing unit 710 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 715 may include one or more memory modules and comprise random access memory (RAM), read only memory (ROM), programmable read only memory (PROM), programmable read-write memory, and solid-state memory. As also shown in FIG. 7A, system unit 705 may also include one or more positional sensors 745, which may comprise an accelerometer, gyrometer, global positioning system (GPS) device, or the like, and which may be used to track the movement of user client devices.

Figure 7B:
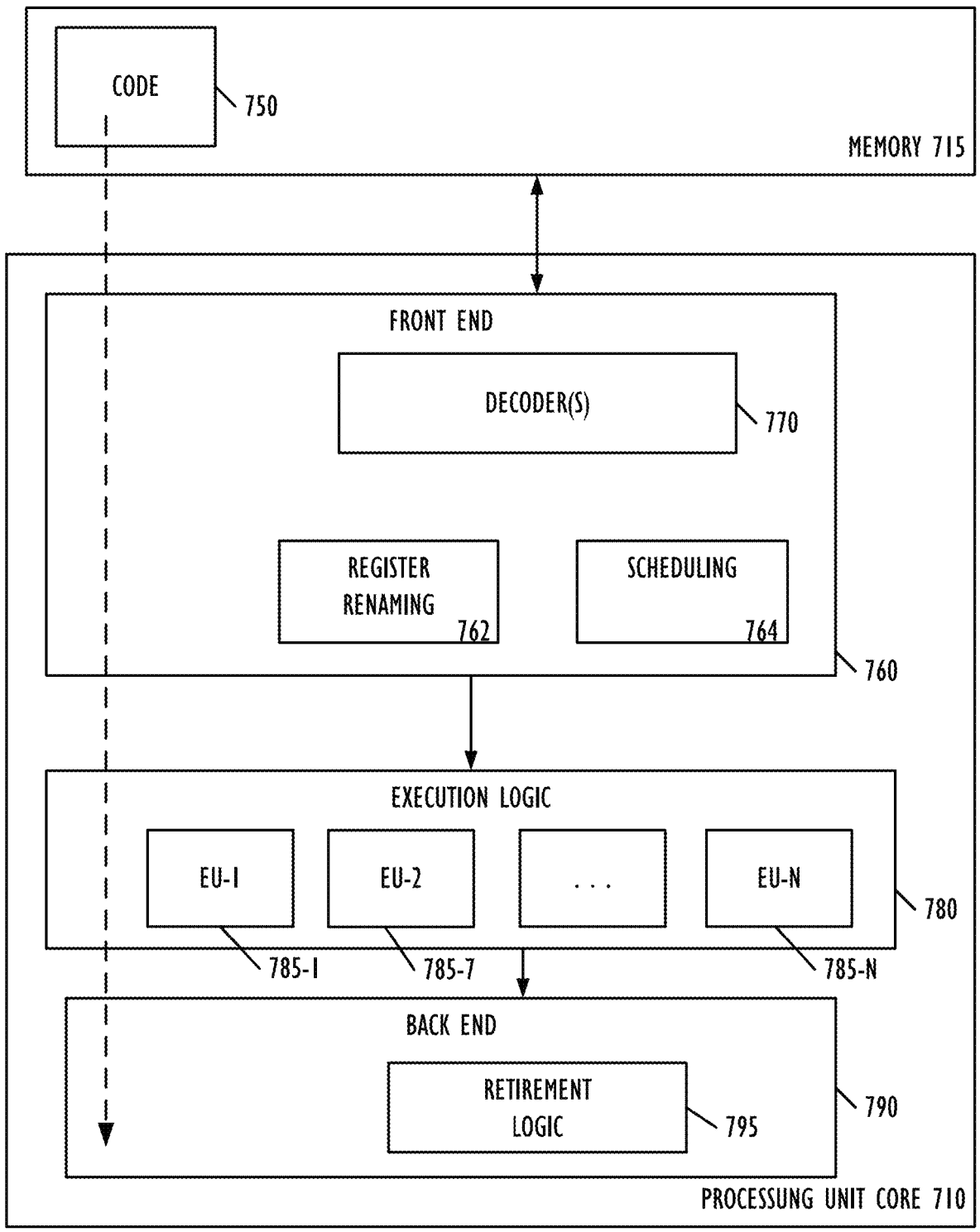
FIG. 7B is a block diagram illustrating a processor core, which may reside on processing device 700, according to one or more disclosed embodiments.

Referring now to FIG. 7B, a processing unit core 710 is illustrated in further detail, according to one embodiment. Processing unit core 710 may be the core for any type of processor, such as a micro-processor, an embedded processor, a digital signal processor (DSP), a network processor, or other device to execute code. Although only one processing unit core 710 is illustrated in FIG. 7B, a processing element may alternatively include more than one of the processing unit core 710 illustrated in FIG. 7B. Processing unit core 710 may be a single-threaded core or, for at least one embodiment, the processing unit core 710 may be multithreaded, in that, it may include more than one hardware thread context (or "logical processor") per core.

FIG. 7B also illustrates a memory 715 coupled to the processing unit core 710. Memory 715 may be any of a wide variety of memories (including various layers of memory hierarchy), as are known or otherwise available to those of skill in the art. Memory 715 may include one or more code instruction(s) 750 to be executed by processing unit core 710. Processing unit core 710 follows a program sequence of instructions indicated by code 750. Each instruction enters a front end portion 760 and is processed by one or more decoders 770. The decoder may generate as its output a micro operation such as a fixed width micro operation in a predefined format, or may generate other instructions, microinstructions, or control signals which reflect the original code instruction. Front end 760 may also include register renaming logic 762 and scheduling logic 764, which generally allocate resources and queue the operation corresponding to the convert instruction for execution.

Processing unit core 710 is shown including execution logic 780 having a set of execution units 785-1 through 785-N. Some embodiments may include a number of execution units dedicated to specific functions or sets of functions. Other embodiments may include only one execution unit or one execution unit that can perform a particular function. Execution logic 780 performs the operations specified by code instructions.

After completion of execution of the operations specified by the code instructions, back end logic 790 retires the instructions of code 750. In one embodiment, processing unit core 710 allows out of order execution but requires in order retirement of instructions. Retirement logic 795 may take a variety of forms as known to those of skill in the art (e.g., re-order buffers or the like). In this manner, processing unit core 710 is transformed during execution of code 750, at least in terms of the output generated by the decoder, the hardware registers and tables utilized by register renaming logic 762, and any registers (not shown) modified by execution logic 780.

Although not illustrated in FIG. 7B, a processing element may include other elements on chip with processing unit core 710. For example, a processing element may include memory control logic along with processing unit core 710. The processing element may include I/O control logic and/or may include I/O control logic integrated with memory control logic. The processing element may also include one or more caches.

Note that while system 700 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or additional components, may also be used with the embodiments described herein.

As a first example the above disclosure may be implemented as a computer-implemented method, system, or computer storage medium. Where the method, system of storage medium comprise information to cause a computer system to perform a method of receiving a first message at a first device, the first message from a first sending entity intended for a first set of users, the first message associated with a first multi-participant message thread; parsing the first message to identify a first set of key identifiers within the first message; categorizing the first message based on the first set of key identifiers, wherein categorizing includes associating the first message with at least one first context; receiving a second message associated with the first multi-participant message thread at the first device, the second message from a second sending entity intended for a second set of users, the second set of users including each user of the first set of users; parsing the second message to identify a second set of key identifies within the second message; categorizing the second message based on the second set of key identifiers, wherein categorizing includes associating the second message with at least one second context; creating a first chunk association between the at least one first context and the at least one second context, the first chunk association based on similarities identified between the first set of key identifiers and the second set of key identifiers; and using the first chunk association to provide an indication of a first chunk of related messages to a user selected from the first set of users.

Example 1 may be extended by determining if there are one or more new recipients, the one or more new recipients representing users in the second set of users not in the first set of users; and retrieving information representative of previous participation in a multi-participant message thread for at least one of the one or more new recipients.

Example 1 may be extended, wherein the second set of users equals the first set of users.

Example 1 may be extended, wherein the second sending entity is different than the first sending entity.

Example 1 may be extended, wherein at least one key identifier from the first or second set of key identifiers is within the body of the message.

Example 1 may be extended, wherein at least one key identifier from the first or second set of key identifiers is within the one or more attachments of the message.

Example 1 may be extended by providing an indication of active user participation with respect to the first chunk of related messages as part of the indication of the first chunk of related messages.

Example 1 may be extended, wherein the indication of active user participation with respect to the first chunk of related messages comprises a ratio of total users within the first multi-participant message thread to users within the first multi-participant message thread that have messages included in the first chunk of related messages.

Example 1 may be extended by receiving a third message associated with the first multi-participant message thread at the first device; parsing the third message to identify a third set of key identifiers within the third message; categorizing the third message based on the third set of key identifiers, wherein categorizing includes associating the third message with at least one third context; determining there are not sufficient similarities identified between the third set of key identifiers and either of the first or second set of key identifiers; and maintaining the third message in the first multi-participant message thread independently of the first chunk of related messages. And possibly continued with receiving a fourth message associated with the first multi-participant message thread at the first device; parsing the fourth message to identify a fourth set of key identifiers within the fourth message; categorizing the fourth message based on the fourth set of key identifiers, wherein categorizing includes associating the fourth message with at least one fourth context; determining there are not sufficient similarities identified between the fourth set of key identifiers and either of the first or second set of key identifiers; creating a second chunk association between the at least one fourth context and the at least one third context, the second chunk association based on similarities identified between the fourth set of key identifiers and the third set of key identifiers; and using the second chunk association to provide an indication of a second chunk of related messages to the user selected from the first set of users. Optionally, wherein the second message is received at a time period between receipt of the third message and the fourth message and each of the first chunk association and second chunk association include messages from an overlapping time period.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

In the foregoing description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

One aspect of the present technology is the gathering and use of data available from various sources to improve the operation of the messaging services. The present disclosure contemplates that in some instances, this gathered data may include personal information data that uniquely identifies a specific person. Such personal information data can include demographic data, location-based data, telephone numbers, email addresses, twitter ID's, home addresses, or any other identifying information.

What is claimed is:

1. A computer-implemented method, comprising:
   receiving a first message at a first device, the first message from a first sending entity intended for a first set of users, the first message associated with a first multi-participant message thread;
   parsing the first message to identify a first set of key identifiers within the first message;
   categorizing the first message based on the first set of key identifiers, wherein categorizing includes associating the first message with at least one first context;
   receiving a second message associated with the first multi-participant message thread at the first device, the second message from a second sending entity intended for a second set of users, the second set of users including each user of the first set of users;
   parsing the second message to identify a second set of key identifies within the second message;
   categorizing the second message based on the second set of key identifiers, wherein categorizing includes associating the second message with at least one second context;
   creating a first chunk association between the at least one first context and the at least one second context, the first chunk association based on similarities identified between the first set of key identifiers and the second set of key identifiers; and
   using the first chunk association to provide an indication of a first chunk of related messages to a user selected from the first set of users.

2. The method of claim 1, further comprising:
   determining if there are one or more new recipients, the one or more new recipients representing users in the second set of users not in the first set of users; and
   retrieving information representative of previous participation in a multi-participant message thread for at least one of the one or more new recipients.

3. The method of claim 1, wherein the second set of users equals the first set of users.

4. The method of claim 1, wherein the second sending entity is different than the first sending entity.

5. The method of claim 1, wherein at least one key identifier from the first or second set of key identifiers is within the body of the message.

6. The method of claim 1, wherein at least one key identifier from the first or second set of key identifiers is within the one or more attachments of the message.

7. The method of claim 1, further comprising:
   providing an indication of active user participation with respect to the first chunk of related messages as part of the indication of the first chunk of related messages.

8. The method of claim 7, wherein the indication of active user participation with respect to the first chunk of related messages comprises a ratio of total users within the first multi-participant message thread to users within the first multi-participant message thread that have messages included in the first chunk of related messages.

9. The method of claim 1, further comprising:
   receiving a third message associated with the first multi-participant message thread at the first device;
   parsing the third message to identify a third set of key identifiers within the third message;
   categorizing the third message based on the third set of key identifiers, wherein categorizing includes associating the third message with at least one third context;
   determining there are not sufficient similarities identified between the third set of key identifiers and either of the first or second set of key identifiers; and
   maintaining the third message in the first multi-participant message thread independently of the first chunk of related messages.

10. The method of claim 9, further comprising:
    receiving a fourth message associated with the first multi-participant message thread at the first device;

parsing the fourth message to identify a fourth set of key identifiers within the fourth message;
categorizing the fourth message based on the fourth set of key identifiers, wherein categorizing includes associating the fourth message with at least one fourth context;
determining there are not sufficient similarities identified between the fourth set of key identifiers and either of the first or second set of key identifiers;
creating a second chunk association between the at least one fourth context and the at least one third context, the second chunk association based on similarities identified between the fourth set of key identifiers and the third set of key identifiers; and
using the second chunk association to provide an indication of a second chunk of related messages to the user selected from the first set of users.

11. The method of claim 10, wherein the second message is received at a time period between receipt of the third message and the fourth message and each of the first chunk association and second chunk association include messages from an overlapping time period.

12. A non-transitory computer readable medium comprising computer executable instructions stored thereon to cause one or more processing units to:
receive a first message at a first device, the first message from a first sending entity intended for a first set of users, the first message associated with a first multi-participant message thread;
parse the first message to identify a first set of key identifiers within the first message;
categorize the first message based on the first set of key identifiers, wherein categorizing includes associating the first message with at least one first context;
receive a second message associated with the first multi-participant message thread at the first device, the second message from a second sending entity intended for a second set of users, the second set of users including each user of the first set of users;
parse the second message to identify a second set of key identifies within the second message;
categorize the second message based on the second set of key identifiers, wherein categorizing includes associating the second message with at least one second context;
create a first chunk association between the at least one first context and the at least one second context, the first chunk association based on similarities identified between the first set of key identifiers and the second set of key identifiers; and
use the first chunk association to present an indication of a first chunk of related messages to a user selected from the first set of users.

13. The non-transitory computer readable medium of claim 12, further comprising executable instructions to cause the one or more processing units to:
determine if there are one or more new recipients, the one or more new recipients representing users in the second set of users not in the first set of users; and
retrieve information representative of previous participation in a multi-participant message thread for at least one of the one or more new recipients.

14. The non-transitory computer readable medium of claim 12, further comprising executable instructions to cause the one or more processing units to:
provide an indication of active user participation with respect to the first chunk of related messages as part of the indication of the first chunk of related messages.

15. The non-transitory computer readable medium of claim 14, wherein the indication of active user participation with respect to the first chunk of related messages comprises a ratio of total users within the first multi-participant message thread to users within the first multi-participant message thread that have messages included in the first chunk of related messages.

16. The non-transitory computer readable medium of claim 12, further comprising executable instructions to cause the one or more processing units to:
receive a third message associated with the first multi-participant message thread at the first device;
parse the third message to identify a third set of key identifiers within the third message;
categorize the third message based on the third set of key identifiers, wherein categorizing includes associating the third message with at least one third context;
determine there are not sufficient similarities identified between the third set of key identifiers and either of the first or second set of key identifiers; and
maintain the third message in the first multi-participant message thread independently of the first chunk of related messages.

17. The non-transitory computer readable medium of claim 16, further comprising executable instructions to cause the one or more processing units to:
receive a fourth message associated with the first multi-participant message thread at the first device;
parse the fourth message to identify a fourth set of key identifiers within the fourth message;
categorize the fourth message based on the fourth set of key identifiers, wherein categorizing includes associating the fourth message with at least one fourth context;
determine there are not sufficient similarities identified between the fourth set of key identifiers and either of the first or second set of key identifiers;
create a second chunk association between the at least one fourth context and the at least one third context, the second chunk association based on similarities identified between the fourth set of key identifiers and the third set of key identifiers; and
use the second chunk association to provide an indication of a second chunk of related messages to the user selected from the first set of users.

18. An apparatus, comprising:
a network communications interface;
a memory; and
one or more processing units, communicatively coupled to the memory and the network communications interface, wherein the memory stores instructions configured to cause the one or more processing units to:
receive a first message at a first device, the first message from a first sending entity intended for a first set of users, the first message associated with a first multi-participant message thread;
parse the first message to identify a first set of key identifiers within the first message;
categorize the first message based on the first set of key identifiers, wherein categorizing includes associating the first message with at least one first context;
receive a second message associated with the first multi-participant message thread at the first device, the second message from a second sending entity intended for a second set of users, the second set of users including each user of the first set of users;
parse the second message to identify a second set of key identifies within the second message;

categorize the second message based on the second set of key identifiers, wherein categorizing includes associating the second message with at least one second context;

create a first chunk association between the at least one first context and the at least one second context, the first chunk association based on similarities identified between the first set of key identifiers and the second set of key identifiers; and use the first chunk association to present an indication of a first chunk of related messages to a user selected from the first set of users.

19. The apparatus of claim 18, further comprising instructions configured to cause the one or more processing units to:

receive a third message associated with the first multi-participant message thread at the first device;

parse the third message to identify a third set of key identifiers within the third message;

categorize the third message based on the third set of key identifiers, wherein categorizing includes associating the third message with at least one third context;

determine there are not sufficient similarities identified between the third set of key identifiers and either of the first or second set of key identifiers; and maintain the third message in the first multi-participant message thread independently of the first chunk of related messages.

20. The apparatus of claim 19, further comprising instructions configured to cause the one or more processing units to:

receive a fourth message associated with the first multi-participant message thread at the first device;

parse the fourth message to identify a fourth set of key identifiers within the fourth message;

categorize the fourth message based on the fourth set of key identifiers, wherein categorizing includes associating the fourth message with at least one fourth context;

determine there are not sufficient similarities identified between the fourth set of key identifiers and either of the first or second set of key identifiers;

create a second chunk association between the at least one fourth context and the at least one third context, the second chunk association based on similarities identified between the fourth set of key identifiers and the third set of key identifiers; and use the second chunk association to provide an indication of a second chunk of related messages to the user selected from the first set of users.

* * * * *